(12) United States Patent
Elgee

(10) Patent No.: US 11,580,949 B2
(45) Date of Patent: Feb. 14, 2023

(54) SYSTEMS AND METHODS FOR COMMUNICATING INFORMATION

(71) Applicant: Polaris Industries Inc., Medina, MN (US)

(72) Inventor: Steven B. Elgee, Portland, OR (US)

(73) Assignee: Polaris Industries Inc., Medina, MN (US)

( * ) Notice: Subject to any disclaimer, the term of this patent is extended or adjusted under 35 U.S.C. 154(b) by 0 days.

(21) Appl. No.: 17/234,518

(22) Filed: Apr. 19, 2021

(65) Prior Publication Data

US 2021/0329430 A1     Oct. 21, 2021

Related U.S. Application Data

(60) Provisional application No. 63/012,811, filed on Apr. 20, 2020.

(51) Int. Cl.

| | | |
|---|---|---|
| *H04B 7/00* | (2006.01) | |
| *G10K 11/178* | (2006.01) | |
| *G01C 21/36* | (2006.01) | |
| *G06T 11/00* | (2006.01) | |
| *H04W 4/48* | (2018.01) | |
| *H04W 4/021* | (2018.01) | |
| *H04W 4/024* | (2018.01) | |
| *H04W 4/80* | (2018.01) | |
| *H04W 4/40* | (2018.01) | |
| *H04W 76/10* | (2018.01) | |
| *G01S 11/14* | (2006.01) | |

(Continued)

(52) U.S. Cl.
CPC ...... *G10K 11/17823* (2018.01); *G01C 21/367* (2013.01); *G01C 21/3682* (2013.01); *G01S 11/14* (2013.01); *G06N 20/00* (2019.01); *G06T 11/00* (2013.01); *G10K 11/1785* (2018.01); *G10K 11/17873* (2018.01); *H02J 7/00712* (2020.01); *H02J 7/02* (2013.01); *H04R 1/1083* (2013.01); *H04W 4/021* (2013.01); *H04W 4/024* (2018.02); *H04W 4/40* (2018.02); *H04W 4/48* (2018.02); *H04W 4/80* (2018.02); *H04W 76/10* (2018.02); *G10K 2210/1081* (2013.01); *G10K 2210/1082* (2013.01); *G10K 2210/1282* (2013.01); *G10K 2210/3012* (2013.01); *G10K 2210/3025* (2013.01); *G10K 2210/3027* (2013.01); *H04R 2460/01* (2013.01)

(58) Field of Classification Search
CPC ......... H04W 4/80; H04W 4/40; H04W 76/10; G01S 11/14
USPC ...................................................... 455/41.2
See application file for complete search history.

(56) References Cited

U.S. PATENT DOCUMENTS

| | | | |
|---|---|---|---|
| 10,418,019 B1* | 9/2019 | Murad | G10K 11/1754 |
| 2013/0022214 A1* | 1/2013 | Dickins | G06F 3/04883 |
| | | | 381/74 |

(Continued)

OTHER PUBLICATIONS

International Search Report and Written Opinion received for PCT Patent Application No. PCT/US21/27901, dated Sep. 17, 2021, 7 pages.

(Continued)

*Primary Examiner* — April G Gonzales
(74) *Attorney, Agent, or Firm* — Faegre Drinker Biddle & Reath LLP

(57) ABSTRACT

Systems and methods for communicating information related to a wearable device are disclosed. Exemplary information includes audio information.

24 Claims, 15 Drawing Sheets

(51) Int. Cl.
  *G06N 20/00* (2019.01)
  *H04R 1/10* (2006.01)
  *H02J 7/00* (2006.01)
  *H02J 7/02* (2016.01)

(56) References Cited

U.S. PATENT DOCUMENTS

| | | | |
|---|---|---|---|
| 2015/0024688 A1* | 1/2015 | Hrabak | H04W 4/80 |
| | | | 455/41.2 |
| 2015/0208364 A1* | 7/2015 | Fukuhara | H04W 4/48 |
| | | | 455/522 |
| 2017/0136875 A1* | 5/2017 | Logan | H04W 4/80 |
| 2017/0171679 A1* | 6/2017 | Isberg | G06F 3/162 |
| 2018/0359554 A1* | 12/2018 | Razouane | G06F 3/165 |
| 2021/0325200 A1* | 10/2021 | Stafford | G06T 11/00 |
| 2021/0327401 A1* | 10/2021 | Stafford | H04W 76/10 |
| 2021/0329368 A1* | 10/2021 | Stafford | H04W 4/40 |

OTHER PUBLICATIONS

Invitation to Pay Additional Fees received for PCT Patent Application No. PCT/US21/27901, dated Jun. 17, 2021, 3 pages.

* cited by examiner

SYSTEMS AND METHODS FOR COMMUNICATING INFORMATION

RELATED APPLICATION

This application claims the benefit of U.S. Provisional Application No. 63/012,811, filed Apr. 20, 2020, titled SYSTEMS AND METHODS FOR COMMUNICATING INFORMATION, the entire disclosure of which is expressly incorporated by reference herein. This application is related to U.S. Provisional Application No. 63/012,814, filed Apr. 20, 2020, titled SYSTEMS AND METHODS FOR VOICE RECEPTION AND DETECTION, U.S. patent application Ser. No. 17/234,501, filed Apr. 19, 2021, titled SYSTEMS AND METHODS FOR COMMUNICATING INFORMATION, U.S. patent application Ser. No. 17/234,521, filed Apr. 19, 2021, titled SYSTEMS AND METHODS FOR COMMUNICATING INFORMATION, and U.S. patent application Ser. No. 17/234,524, filed Apr. 19, 2021, titled SYSTEMS AND METHODS FOR COMMUNICATING INFORMATION, the entire disclosures of which are expressly incorporated by reference herein.

TECHNICAL FIELD

The present disclosure relates generally to a communication system and, more particularly, to a communication system having a microphone for voice reception and/or voice detection.

BACKGROUND

Recreational vehicles, such as motorcycles, or off-road vehicles such as all-terrain vehicles (ATVs) and snowmobiles, are widely used for recreational purposes. During rides, users (e.g., drivers/riders) may control some features of the recreational vehicles via voice commands and/or may participate in telephone or radio communications. To do so, the users may wear wearable devices with one or more microphones (e.g., a headset or a helmet with a microphone) to capture user's voice or speech. However, it is inevitable that the microphones also capture noise (e.g., engine noise, tire noise, wind noise) in addition to the voice of the user during the rides.

SUMMARY

As set forth above, embodiments provided herein relate to route planning for a recreational vehicle. Exemplary embodiments include but are not limited to the following examples.

In one aspect, a wearable device for noise-cancelling of ambient sounds is provided. The wearable device includes an exterior microphone, a speaker, a processor, and memory including instructions that when executed by the processor cause the processor to receive audio input signals from the exterior microphone of the wearable device, perform an active noise control to filter ambient noise from the audio input signals, and deliver the filtered audio signals to the user via a speaker of the wearable device.

In some embodiments, the exterior microphone may be mounted on an exterior surface of the wearable device to capture environment sounds. In other embodiments, an interior microphone may be mounted on an interior surface of the wearable device facing toward a user of the wearable device to capture a user's voice.

In some embodiments, to perform the active noise control may include to detect ambient noise from the audio input signals.

In some embodiments, to detect ambient noise from the audio input signals may include to detect ambient noise using machine learning algorithms.

In another aspect, a method for noise-cancelling of ambient sounds captured by a wearable device is provided. The method includes receiving, by the wearable device, audio input signals from an exterior microphone of the wearable device, performing, by the wearable device, an active noise control to filter ambient noise from the audio input signals, and delivering, by the wearable device, the filtered audio signals to the user via a speaker of the wearable device.

In some embodiments, the exterior microphone may be mounted on an exterior surface of the wearable device to capture environment sounds. In other embodiments, the interior microphone may be mounted on an interior surface of the wearable device facing toward a user of the wearable device to capture a user's voice.

In other embodiments, performing the active noise control may include detecting ambient noise from the audio input signals.

In other embodiments, detecting ambient noise from the audio input signals may include detecting ambient noise using machine learning algorithms.

In another aspect, a wearable device for establishing a communication channel between the wearable device and a recreational vehicle that is in close proximity to the wearable device is provided. The wearable device includes a communication device, a processor operatively coupled to the communication device, and memory comprising instructions that when executed by the processor cause the processor to detect a recreational vehicle that is in a range of the communication device, determine, in response to a detection by the wearable device, if the wearable device has been previously paired with the recreational vehicle, and establish, in response to a determination that the wearable device has been previously paired with the recreational vehicle, a communication channel with the recreational vehicle.

In some embodiments, to detect the recreational vehicle that is in the range of the communication device may include to detect a recreational vehicle using at least one of radiofrequency fields, magnetic fields, and sound waves.

In some embodiments, to detect the recreational vehicle that is in the range of the communication device may include to: detect radio signals generated by a recreational vehicle, determine a strength of the radio signals, determine whether the strength of the radio signals is above a predefined threshold, and determine, in response to a determination that the strength of the radio signals is above the predefined threshold, that the recreational vehicle is in the range of the communication device.

In some embodiments, to detect the recreational vehicle that is in the range of the communication device may include to: detect low frequency magnetic fields generated by a recreational vehicle, determine a strength of the low frequency magnetic fields, determine a distance from the recreational vehicle based on the strength of the low frequency magnetic fields, and determine whether the recreational vehicle is in the range of the communication device.

In some embodiments, to detect the recreational vehicle that is in the range of the communication device may include to: detect sound waves generated by a recreational vehicle, measure an elapsed time of the sound waves using the speed of sound, determine a distance from the recreational vehicle based on the elapsed time, and determine whether the recreational vehicle is in the range of the communication device.

In some embodiments, the elapsed time may be a time duration between a start time that the sound waves were transmitted from the recreational vehicle and an end time the sound waves were received by the wearable device.

In some embodiments, the memory may further include instructions that when executed by the processor cause the processor to perform, in response to a determination that the wearable device has not been previously paired with the recreational vehicle and by the wearable device, an initial pairing process to set up a communication channel between the wearable device.

In some embodiments, to perform the initial pairing process may include to: prompt a user of the wearable device whether to pair with the recreational vehicle, receive an authorization from the user, and communicate with the recreational vehicle to establish the communication channel.

In some embodiments, to perform the initial pairing process may include to: prompt a user of the recreational vehicle whether to pair with the wearable device, receive an authorization from the user, and communicate with the wearable device to establish the communication channel.

In some embodiments, the communication channel may be an audio communication channel.

In another aspect, a method for establishing a communication channel between the wearable device and a recreational vehicle that is in close proximity to the wearable device is provided. The method includes detecting, by the wearable device, a recreational vehicle that is in a range of a communication device of the wearable device, determining, in response to detecting that the recreational vehicle is in a range of a communication device of the wearable device and by the wearable device, if the wearable device has been previously paired with the recreational vehicle, and establishing, in response to determining that the wearable device has been previously paired with the recreational vehicle and by the wearable device, a communication channel with the recreational vehicle.

In some embodiments, detecting the recreational vehicle that is in a range of a communication device of the wearable device may include detecting, by the wearable device, a recreational vehicle using at least one of radiofrequency fields, magnetic fields, and sound waves.

In some embodiments, detecting the recreational vehicle recreational vehicle that is in a range of a communication device of the wearable device may include detecting, by the wearable device, radio signals generated by a recreational vehicle, determining, by the wearable device, a strength of the radio signals, determining, by the wearable device, whether the strength of the radio signals is above a predefined threshold, and determining, in response to determining that the strength of the radio signals is above the predefined threshold and by the wearable device, that the recreational vehicle is the range of the communication device.

In some embodiments, detecting the recreational vehicle recreational vehicle that is in a range of a communication device of the wearable device may include detecting, by the wearable device, low frequency magnetic fields generated by a recreational vehicle, determining, by the wearable device, a strength of the low frequency magnetic fields, determining, by the wearable device, a distance from the recreational vehicle based on the strength of the low frequency magnetic fields, and determining, by the wearable device, whether the recreational vehicle is the range of the communication device.

In some embodiments, detecting the recreational vehicle recreational vehicle that is in a range of a communication device of the wearable device may include detecting, by the wearable device, sound waves generated by a recreational vehicle, measuring, by the wearable device, an elapsed time of the sound waves using the speed of sound, determining, by the wearable device, a distance from the recreational vehicle based on the elapsed time, and determining, by the wearable device, whether the recreational vehicle is the range of the communication device.

In some embodiments, the elapsed time is a time duration between a start time that the sound waves were transmitted from the recreational vehicle and an end time the sound waves were received by the wearable device.

In some embodiments, the method may further include performing, in response to determining that the wearable device has not been previously paired with the recreational vehicle and by the wearable device, an initial pairing process to set up a communication channel between the wearable device.

In some embodiments, performing the initial pairing process may include prompting, by the wearable device, a user of the wearable device whether to pair with the recreational vehicle, receiving, by the wearable device, an authorization from the user, and communicating, by the wearable device, with the recreational vehicle to establish the communication channel.

In some embodiments, performing the initial pairing process may include prompting, by the recreational vehicle, a user of the recreational vehicle whether to pair with the wearable device, receiving, by the recreational vehicle, an authorization from the user, and communicating, by the recreational vehicle, with the wearable device to establish the communication channel.

In some embodiments, the communication channel may be an audio communication channel.

In other aspect, a wearable device for minimizing a battery power usage of a wearable device is provided. The wearable device includes a communication device, a processor, and memory comprising instructions that when executed by the processor cause the processor to: determine if a recreational vehicle is in a range of the communication device, determine, in response to a determination that the recreational vehicle is in the range of the communication device, a state of an engine of the recreational vehicle, and activate, in response to a determination that the engine of the recreational vehicle is running, a noise-cancelling feature of the wearable device.

In some embodiments, to determine the state of the engine of the recreational vehicle may include to measure a harmonic content of the engine to determine the state of the engine of the recreational vehicle.

In some embodiments, to determine the state of the engine of the recreational vehicle may include to receive a message from the recreational vehicle including the state of the engine.

In some embodiments, the recreational vehicle may be in the range of the communication device when the wearable device is near or inside a recreational vehicle.

In some embodiments, the memory further comprising instructions that when executed by the processor cause the processor to: activate, in response to a determination that the recreational vehicle is not in the range of the communication device, the wearable device without a noise-cancelling feature, determine whether an elapsed time exceeds a predefined threshold, and inactivate, in response to a determination that the elapsed time exceeds the predefined threshold, the wearable device.

In some embodiments, the memory further comprising instructions that when executed by the processor cause the processor to: activate, in response to a determination that the engine of the recreational vehicle is not running, the wearable device without a noise-cancelling feature, determine whether an elapsed time exceeds a predefined threshold, and inactivate, in response to a determination that the elapsed time exceeds the predefined threshold, the wearable device.

In other aspect, a method for minimizing a battery power usage of a wearable device is provided. The method includes determining, by a wearable device, if a recreational vehicle is in a range of the communication device, determining, in response to a determination that the recreational vehicle is in the range of the communication device and by a wearable device, a state of an engine of the recreational vehicle, and activating, in response to a determination that the engine of the recreational vehicle is running and by a wearable device, a noise-cancelling feature of the wearable device.

In some embodiments, determining the state of the engine of the recreational vehicle may include measuring a harmonic content of the engine to determine the state of the engine of the recreational vehicle.

In some embodiments, determining the state of the engine of the recreational vehicle may include receiving a message from the recreational vehicle including the state of the engine.

In some embodiments, the recreational vehicle may be in the range of the communication device when the wearable device is near or inside a recreational vehicle.

In some embodiments, the method may further include activating, in response to determining that the recreational vehicle is not in the range of the communication device, the wearable device without a noise-cancelling feature, determining, by the wearable device, whether an elapsed time exceeds a predefined threshold, and inactivating, in response to determining that the elapsed time exceeds the predefined threshold and by the wearable device, the wearable device.

In some embodiments, the method may further include activating, in response to determining that the engine of the recreational vehicle is not running and by the wearable device, the wearable device without a noise-cancelling feature, determining, by the wearable device, whether an elapsed time exceeds a predefined threshold, and inactivating, in response to determining that the elapsed time exceeds the predefined threshold and by the wearable device, the wearable device.

In other aspect, a system for wirelessly charging a wearable device is provided. The system includes a recreational vehicle with a seat having a charging pad configured to generate a magnetic field, and a wearable device having a receiver configured to detect the magnetic field and charge a battery of the wearable device.

In some embodiments, the charging pad may be embedded in a headrest of the seat of the recreational vehicle, and the receiver is embedded at a back surface of the wearable device where the wearable device is likely be in close proximity to the headrest of the seat of the recreational vehicle.

In some embodiments, the wearable device may be a helmet.

In other aspect, a method for wirelessly charging a wearable device is provided. The method includes generating, by a charging pad of a recreational vehicle, a magnetic field, detecting, by a receiver of a wearable device, the magnetic field, and charging, by the receiver of a wearable device, a battery of the wearable device when the magnetic field is detected.

In some embodiments, the charging pad may be embedded in a headrest of the seat of the recreational vehicle, and the receiver is embedded at a back surface of the wearable device where the wearable device is likely be in close proximity to the headrest of the seat of the recreational vehicle.

In some embodiments, the wearable device may be a helmet.

In other aspect, a recreational vehicle for guiding toward a leading recreational vehicle is provided. The recreational vehicle includes a processor and memory comprising instructions that when executed by the processor cause the processor to: display a current location of a leading recreational vehicle relative to a current location of the recreational vehicle on a display screen of the recreational vehicle, determine whether the recreational vehicle is following a travel path of the leading recreational vehicle, determine, in response to a determination that the recreational vehicle is not following the riding path of the leading recreational vehicle, a distance between the current location of the recreational vehicle and the travel path, determine if the distance exceeds a predefined threshold, and display, in response to a determination that the distance exceeds the predefined threshold, a visual warning alert on the display screen.

In some embodiments, the memory may further include instructions that when executed by the processor cause the processor to play, in response to a determination that the distance exceeds the predefined threshold and by the recreational vehicle, an audio warning alert via one or more speakers of the recreational vehicle.

In some embodiments, the memory may further include instructions that when executed by the processor cause the processor to display one or more current locations of one or more non-leading recreational vehicles relative to the current location of the recreational vehicle on the display screen of the recreational vehicle.

In other aspect, a method for guiding toward a leading recreational vehicle is provided. The method includes displaying, by a recreational vehicle, a current location of a leading recreational vehicle relative to a current location of the recreational vehicle on a display screen of the recreational vehicle, determining, by the recreational vehicle, whether the recreational vehicle is following a travel path of the leading recreational vehicle, determining, in response to determining that the recreational vehicle is not following the riding path of the leading recreational vehicle and by the recreational vehicle, a distance between the current location of the recreational vehicle and the travel path, determining, by the recreational vehicle, if the distance exceeds a predefined threshold, and displaying, in response to determining that the distance exceeds the predefined threshold and by the recreational vehicle, a visual warning alert on the display screen.

In some embodiments, the method may further include playing, in response to determining that the distance exceeds the predefined threshold and by the recreational vehicle, an audio warning alert via one or more speakers of the recreational vehicle.

In some embodiments, the method may further include displaying, by the recreational vehicle, one or more current locations of one or more non-leading recreational vehicles relative to the current location of the recreational vehicle on the display screen of the recreational vehicle.

In one aspect, a recreational vehicle for assisting navigation using augmented reality is provided. The recreational vehicle includes a compass, surround view cameras, a processor, and memory comprising instructions that when executed by the processor cause the processor to: display a live view of environment of the recreational vehicle in a direction that the recreational vehicle is travelling on a display screen of the recreational vehicle, determine one or more point of interest markers, and overlay the point of interest markers in augmented reality on the live view of the environment on the display screen.

In some embodiments, the one or more point of interest markers may include at least one of a destination location, a start location, landmarks, and/or other recreational vehicle's location.

In other aspect, a method for assisting navigation using augmented reality is provided. The method includes displaying, by a recreational vehicle, a live view of environment of the recreational vehicle in a direction that the recreational vehicle is travelling on a display screen of the recreational vehicle, determinizing, by the recreational vehicle, one or more point of interest markers, and overlaying, by the recreational vehicle, the point of interest markers in augmented reality on the live view of the environment on the display screen.

In some embodiments, the one or more point of interest markers may include at least one of a destination location, a start location, landmarks, and/or other recreational vehicle's location.

In one aspect, a wearable device for assisting navigation using augmented reality is provided. The wearable device includes a processor and memory comprising instructions that when executed by the processor cause the processor to: determine one or more point of interest markers, and overlay the point of interest markers in augmented reality on a live view of environment that the user is viewing through a transparent display of the wearable device.

In some embodiments, the one or more point of interest markers may include at least one of a destination location, a start location, landmarks, and/or other recreational vehicle's location.

In some embodiments, the wearable device may further include a communication system that is communicatively coupled to a recreational vehicle, wherein the memory further comprising instructions that when executed by the processor cause the processor to receive the point of interest markers from the recreational vehicle.

In other aspect, a method for assisting navigation using augmented reality is provided. The method includes determinizing, by the wearable device, one or more point of interest markers, and overlaying, by the wearable device, the point of interest markers in augmented reality on a live view of environment that the user is viewing through a transparent display of the wearable device.

In some embodiments, the one or more point of interest markers may include at least one of a destination location, a start location, landmarks, and/or other recreational vehicle's location.

In some embodiments, the method may further include receiving, by a communication system of the recreational vehicle that is communicatively coupled to a recreational vehicle, the point of interest markers from the recreational vehicle.

In one aspect, a light indicator system is provided. The light indicator system comprising a light source embedded in a first wearable device worn by a user and a light pipe embedded in a second wearable device. The light pipe is adapted to transfer light from the light source into a field of view of the user and configured to provide an indication or a notification to the user.

In some embodiments, the first wearable device may be a helmet and the second wearable device may be a goggle In some embodiments, the first wearable device and the second wearable device may be integrated into a single housing.

In some embodiments, the light pipe may be made of acrylic, polycarbonate, and/or a material that has a light-reflective property.

In one aspect, a wearable device is provided. The wearable device comprising an earpiece adapted to cover at least a portion of a user's ear, an actuator connected to the earpiece, and a controller communicatively coupled to the actuator. The controller is configured to receive a vehicle state of a vehicle to activate the actuator to control a position of the earpiece based in part on the vehicle state.

In some embodiments, the vehicle state may include a gear position of the vehicle.

In some embodiments, the controller may activate the actuator to push the earpiece into the user's ear in response to receiving the vehicle state indicating that the vehicle is in a drive gear.

In some embodiments, the controller may activate the actuator to move the earpiece back away from the user's ear in response to receiving the vehicle state indicating that the vehicle is no longer in the drive gear.

In some embodiments, the controller may further be configured to adjust the position of the actuator based on an engine speed, a vehicle speed, a vehicle acceleration, and/or a vehicle deceleration.

In some embodiments, the vehicle state may include a gear position, an engine speed, a vehicle speed, vehicle acceleration, and/or vehicle deceleration.

In one aspect, an energy management system is provided. The energy management system comprising an external battery and a wearable device. The wearable device including a component that requires power, an internal battery configured to provide energy to the component, and an energy regulator connected to the internal battery and removably coupled to the external battery and configured to determine a battery level of the internal battery.

In some embodiments, the external battery may be a vehicle and/or a portable battery bank.

In some embodiments, the energy regulator may be configured to charge the internal battery in response to a determination that the battery level of the internal battery satisfies a first condition.

In some embodiments, the energy regulator may be configured to charge the internal battery to maintain the battery level of the internal battery in response to a determination that the battery level of the internal battery satisfies a second condition.

In some embodiments, the energy regulator may be configured to supplement energy to the component in response to a determination that the battery level of the internal battery is satisfies a third condition.

While multiple embodiments are disclosed, still other embodiments of the presently disclosed subject matter will become apparent to those skilled in the art from the following detailed description, which shows and describes illustrative embodiments of the disclosed subject matter. Accordingly, the drawings and detailed description are to be regarded as illustrative in nature and not restrictive.

BRIEF DESCRIPTION OF THE DRAWINGS

The above-mentioned and other features and advantages of this disclosure, and the manner of attaining them, will become more apparent and will be better understood by reference to the following description of embodiments of the invention taken in conjunction with the accompanying drawings, wherein.

Figure 1:
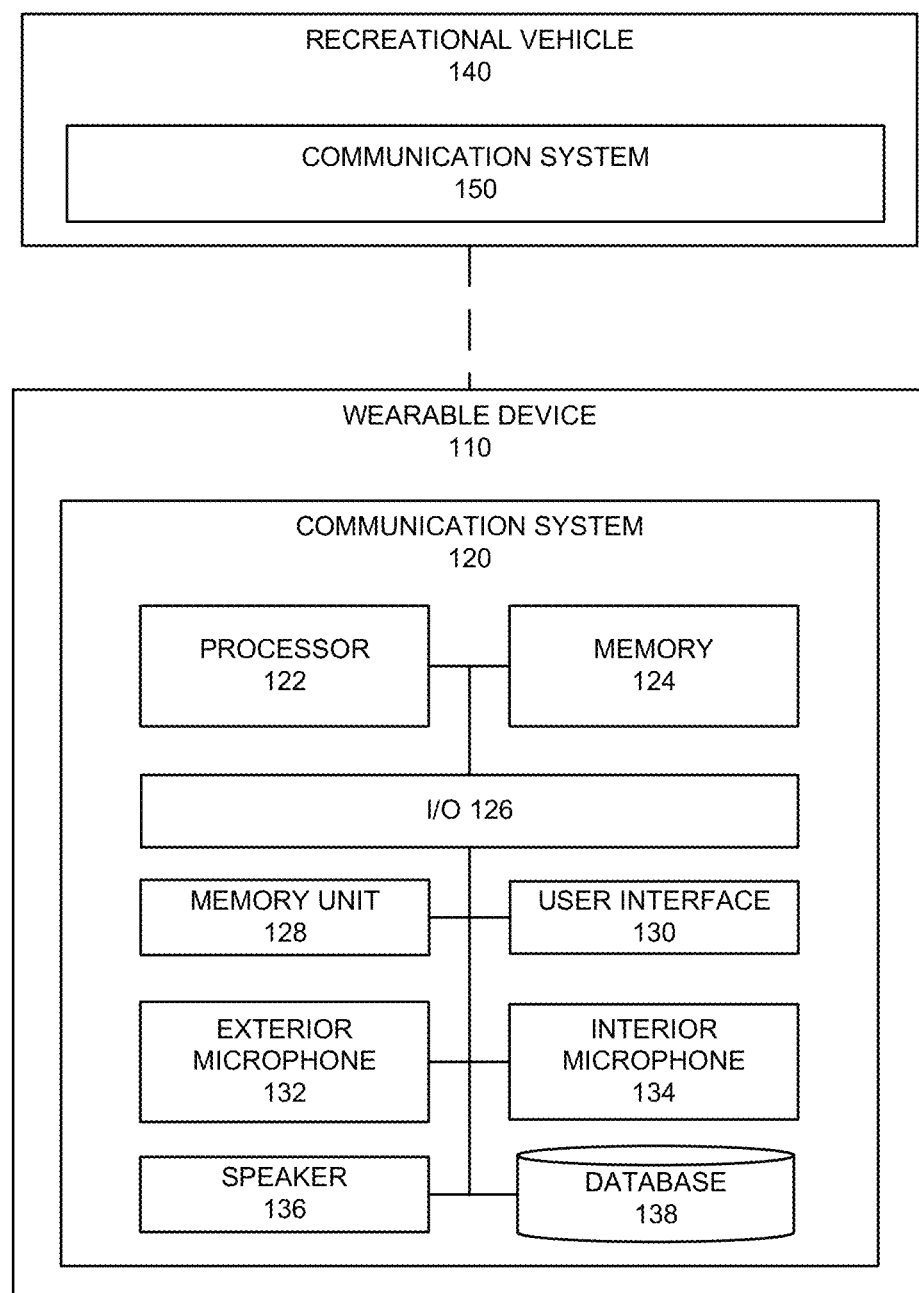
FIG. 1 illustrates a system for noise-cancelling of ambient sounds including a wearable device that is communicatively coupled to a recreational vehicle, according to an example of the present disclosure.

Corresponding reference characters indicate corresponding parts throughout the several views. Although the drawings represent embodiments of the present disclosure, the drawings are not necessarily to scale, and certain features may be exaggerated in order to better illustrate and explain the present disclosure. The exemplification set out herein illustrates an embodiment of the disclosure, in one form, and such exemplifications are not to be construed as limiting the scope of the disclosure in any manner.

DETAILED DESCRIPTION OF THE DRAWINGS

Various embodiments of the present invention will be described in detail with reference to the drawings, wherein like reference numerals represent like parts and assemblies throughout the several views. Reference to various embodiments does not limit the scope of the invention, which is limited only by the scope of the claims attached hereto. Additionally, any examples set forth in this specification are not intended to be limiting and merely set forth some of the many possible embodiments for the claimed invention.

Referring to FIG. 1, a system 100 for noise-cancelling of ambient sounds is shown. In the illustrative embodiment, the system 100 includes a wearable device 110 (e.g., a helmet) that may be communicatively coupled to a recreational vehicle 140. For example, the wearable device 110 may be communicatively coupled to the recreational vehicle 140 wirelessly (e.g., via Bluetooth or WiFi) or via a wire. It should be appreciated that the wearable device 110 is adapted to be worn by a user (e.g., a driver/rider) when riding the recreational vehicle 140 for safety and communication. During the ride, environment noise (e.g., engine noise, tire noise, wind) may hinder the user's ability to hear the sounds from the wearable device 110 and may distract the user from enjoying the ride. At the same time, completely blocking the environment noise is not safe for the user as the user needs to be aware of the environment for safety reasons. As such, the illustrative wearable device 110 is configured to filter the environment noise while allowing sounds, talking, and exterior noises that are not ambient noise, such as traffic noise, warning sounds, and emergency vehicle sounds, to be delivered to the user. An example of the wearable device embodied as a helmet is described in U.S. patent application Ser. No. 16/668,980 "Connected Helmet System And Method Of Operating The Same," filed Oct. 30, 2019, the entire disclosure of which is expressly incorporated by reference herein.

In the illustrative embodiment, the wearable device 110 includes a communication system 120 that is configured to cancel ambient noise detected from an exterior of the wearable device 110. In the illustrative embodiment, the communication system 120 includes a processor 122, a memory 124, an input/output (I/O) controller 126 (e.g., a network transceiver), a memory unit 128, an user interface 130, an external microphone 132, an interior microphone 134, and a speaker 136, all of which may be interconnected via one or more address/data bus. Although the I/O controller 126 is shown as a single block, it should be appreciated that the I/O controller 126 may include a number of different types of I/O components. The user interface 130 may include one or more input devices that can receive user input (e.g., buttons, a touch pad, a keyboard).

The processor 122 as disclosed herein may be any electronic device that is capable of processing data, for example a central processing unit (CPU), a graphics processing unit (GPU), a system on a chip (SoC), or any other suitable type of processor. It should be appreciated that the various operations of example methods described herein (i.e., performed by the communication system 120) may be performed by one or more processors 122. The memory 124 may be a random-access memory (RAM), read-only memory (ROM), a flash memory, or any other suitable type of memory that enables storage of data such as instruction codes that the processor 122 needs to access in order to implement any method as disclosed herein. It should be appreciated that although only one processor 122 is shown, the communication system 120 may include multiple processors 122.

The communication system 120 may further include a database 138. As used herein, the term "database" may refer to a single database or other structured data storage, or to a collection of two or more different databases or structured data storage components. In the illustrative embodiment, the database 138 is part of the communication system 120. In some embodiments, the communication system 120 may access the database 138 via a network (not shown). The database 138 may store data that is received from and/or to be transmitted to one or more communication systems of the recreational vehicle 140 and/or the computing device 160 (e.g., a user's mobile device, another wearable device, or a server).

It should be appreciated that each of other wearable devices includes a communication system similar to the communication system 120 of the wearable device 110. In general, the computing device 160 may include any existing or future devices capable of receiving and/or transmitting data to and from the user. For example, the computing device may be, but not limited to, a mobile device, a smartphone, a tablet, wearable, smart glasses, a computer, a notebook, a laptop, or any other suitable computing device that is capable of communicating with the communication system 120 of the wearable device 110.

The communication system 120 may further include a number of software applications stored in memory unit 128, which may be called a program memory. The various software applications on the communication system 120 may include specific programs, routines, or scripts for performing processing functions associated with the methods described herein. Additionally or alternatively, the various software applications on the communication system 120 may include general-purpose software applications for data processing, database management, data analysis, network communication, web server operation, or other functions described herein or typically performed by a communication system of a wearable device (e.g., a helmet). The various software applications may be executed on the same computer processor or on different computer processors. Additionally, or alternatively, the software applications may interact with various hardware modules that may be installed within or connected to the communication system 120. Such modules may implement part of or all of the various exemplary method functions discussed herein or other related embodiments.

The external microphone 132 may be any electronic device that are capable of capturing sound and converting into an electrical audio output signal. The external microphone 132 is configured to be positioned at the exterior of the wearable device 110 to capture sounds from the exterior of the wearable device 110. For example, if the wearable device 110 is embodied as a helmet, the external microphone 132 is mounted on an exterior surface of the helmet to capture the environment sounds from the exterior of the helmet. The environment sounds may include voices and sounds that the user is interested in hearing or needs to hear to be aware of the environment (e.g., traffic noise, warning sounds, and emergency vehicle sounds). However, the environment sounds also includes ambient noise, such as engine noise, tire noise, wind noise, which may hinder the user's ability to hear the sounds coming from the speaker 136 of the wearable device 110 during a ride and may even distract the user from enjoying the ride. As such, as discussed further in FIG. 2, the audio signals from the external microphone 132 may be filtered to remove the ambient noise but keep sounds, talking, and exterior noises that are not ambient noise. It should be appreciated that although only one exterior microphone is shown, the communication system 120 of the wearable device 110 may include multiple exterior microphones.

The interior microphone 134 may be any electronic device that are capable of capturing sound and converting into an electrical audio output signal. The interior microphone 134 is configured to be positioned on an interior surface of the wearable device 110 facing toward the user's face to receive audible sound from the user. For example, if the wearable device 110 is embodied as a helmet, the interior microphone 134 is mounted inside the helmet near the user's mouth to capture the user's speech or voice. It should be appreciated that the audio signals from the interior microphone 134 may be transmitted to a communication system (e.g., 150), a navigation system, an entertainment system of the recreational vehicle 140 for voice commands, phone or radio communications, vehicle-to-vehicle communications, or other wearable device-to-vehicle features (e.g., to create a voice-to-text message or email). It should be appreciated that although only one interior microphone is shown, the communication system 120 of the wearable device 110 may include multiple interior microphones.

The speaker 136 may be any electronic device that are capable of producing sound in response to an electrical audio signal input. In the illustrative embodiment, the speaker 136 is positioned near the user's ears to transmit audible sound to the user. If the wearable device 110 is embodied as a helmet, the speaker 136 may be positioned inside the helmet near the user's ears to transmit audible sound to the user. It should be appreciated that the speaker 136 may be communicatively coupled to the recreational vehicle 140 to receive audio from a communication system, a navigation system, and/or an entertainment system of the recreational vehicle 140 for music, navigation, phone or radio communications, vehicle-to-vehicle communications, or other wearable device-to-vehicle features (e.g., to create a voice-to-text message or email). It should be appreciated that, in some embodiments, the speaker 136 may be communicatively coupled to the communication system 120 wirelessly (e.g., via Bluetooth or WiFi). It should also be appreciated that although only one speaker is shown, the communication system 120 of the wearable device 110 may include multiple speakers.

The system 100 may further include one or more computing device (e.g., a user's mobile device or a server) and/or other wearable devices that are communicatively coupled to the wearable device 110 via a network (not shown). The network is any suitable type of computer network that functionally couples the communication system 120 of the wearable device 110 with the recreational vehicle 140 and/or one or more computing devices (e.g., a mobile device, a communication system of another wearable device, and/or a server). The network may include a proprietary network, a secure public internet, a virtual private network and/or one or more other types of networks, such as dedicated access lines, plain ordinary telephone lines, satellite links, cellular data networks, or combinations thereof. In embodiments where the network comprises the Internet, data communications may take place over the network via an Internet communication protocol. The network may be, or include, any number of different types of communication networks such as, for example, a bus network, a short messaging service (SMS), a local area network (LAN), a wireless LAN (WLAN), a wide area network (WAN), a personal area network (PAN), the Internet, a P2P network, custom-designed communication or messaging protocols, and/or the like. The network may include a combination of multiple networks.

It should be appreciated that this diagram is merely an example, which should not unduly limit the scope of the claims. One of ordinary skill in the art would recognize many variations, alternatives, and modifications.

Figure 2:
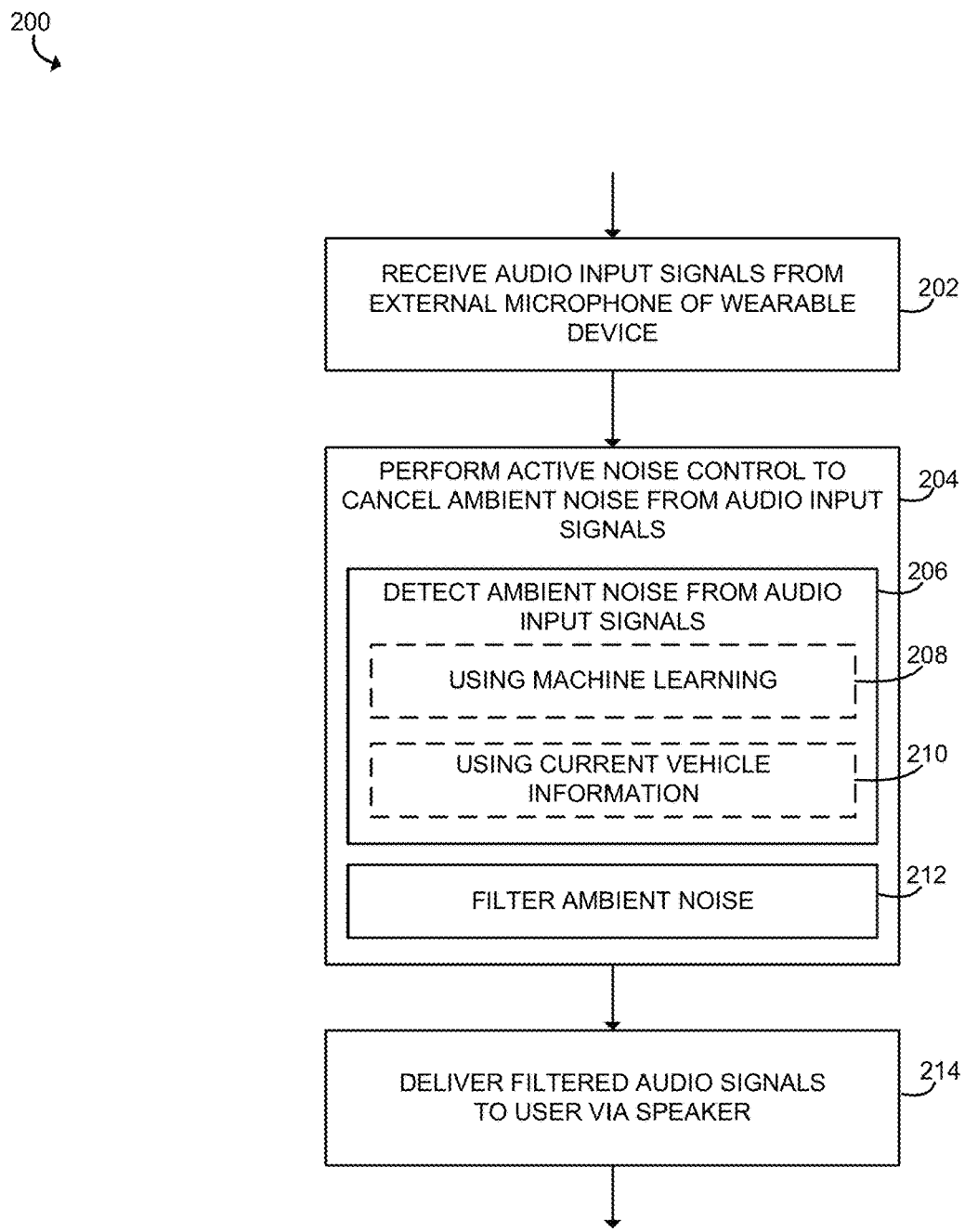
FIG. 2 is a flow diagram illustrating a computer-implemented method for noise-cancelling of ambient sounds using the wearable device of FIG. 1.

Referring now to FIG. 2, a computer-implemented method 200 for noise-canceling of the wearable device (e.g., 110) is shown. In the illustrative embodiment, the method 200 is performed by the communication system 120 of the wearable device 110. In block 202, the communication system 120 receives audio input signals from the exterior microphone 132 of the wearable device 110, which captures sounds coming from the exterior of the wearable device 110.

The exterior microphone 132 may capture environment or ambient noise, such as engine noise, tire noise, driveline noise, wind noise, and clutch noise.

As discussed above, the environment noise (e.g., engine noise, tire noise, wind) may hinder the user's ability to hear the sounds from the wearable device 110 during a ride and may distract the user from enjoying the ride. At the same time, completely blocking the environment noise is not desired. As such, in block 204, the communication system 120 performs an active noise control to cancel the ambient noise from the audio input signals. To do so, the communication system 120 detects the ambient noise from the audio input signals. In some embodiments, the communication system 120 may use machine learning algorithms to detect ambient noise, as indicated in block 208. For example, the communication system 120 may be trained to learn to recognize various ambient noise patterns, and those patterns may be stored in the database 138. Additionally or alternatively, in some embodiments, the communication system 120 may use current vehicle information of a recreational vehicle (e.g., 140) that the user is riding to detect or identify noise from the audio input signals. Specifically, such noise may relate to engine noise that is generated based on a state of an engine of the recreational vehicle.

The current vehicle information may include a type/model/make of the recreational vehicle, a vehicle noise profile associated with the recreational vehicle, and current state of the engine of the recreational vehicle in or near real-time. The current state of the engine may include any current state of the engine parameters, such as an engine phase, an engine speed, a transmission gear, a clutch position, a throttle position, and a wheel speed of the recreational vehicle. It should be appreciated that the vehicle noise profile may be generated based on known engine parameters (e.g., an engine phase, an engine speed, a transmission gear, a clutch position, a throttle position, and a wheel speed) of the respective or similar recreational vehicle.

In other words, based on the current state of the engine of the recreational vehicle, the communication system 120 may predict what the expected noise is going to be and remove the expected noise from the audio input signals from the exterior microphone 132 of the wearable device 110. This allows the communication system 120 to remove sudden noises generated by the vehicle that may not have been otherwise characterized as noise. It should be appreciated that, in the illustrative embodiment, the vehicle noise profile is pre-loaded on the communication system 120 prior to receiving the audio data. However, in some embodiments, the vehicle noise profile may be obtained in real-time.

Subsequently, in block 212, the communication system 120 filters the detected ambient noise from the audio input signals. For example, the communication system 120 may use a low pass filter to remove high frequency noise and/or a high pass filter to remove low frequency noise from the audio input signals.

Once the active noise control is performed, in block 214, the communication system 120 delivers the filtered audio signals to the user via the speaker 136. This allows the communication system 120 to filter the environment noise while allowing sounds, talking, and exterior noises that are not ambient noise (e.g., traffic, warning sound, emergency vehicle sound) to be delivered to the user. It should be appreciated that the filtered audio signal may also be delivered to a communication system (e.g., 150) of a recreational vehicle (e.g., 140) or to any other device that may be communicatively coupled to the communication system 120.

It should be appreciated that the method 200 may be performed by the processor 122, the exterior microphone 132, the speaker 136, or an analog circuitry (not shown) of the communication system 120 of the wearable device 110.

Figure 3:
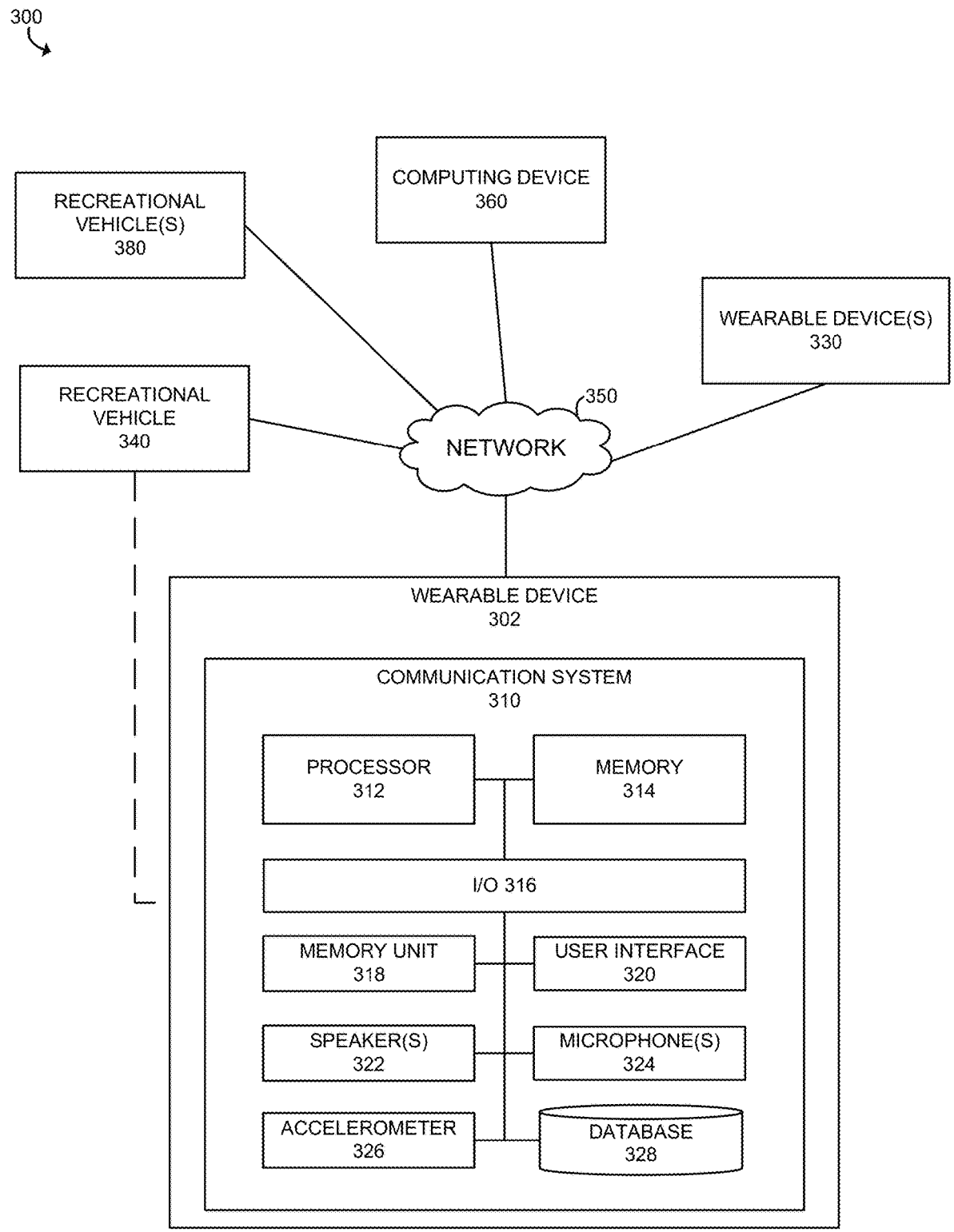
FIG. 3 illustrates a system for voice reception of a user including a wearable device of the user having a communication system, according to an example of the present disclosure.

Referring now to FIG. 3, a system 300 for detecting a voice of a user (e.g., a driver/rider) of a recreational vehicle 340 via a wearable device 302 (e.g., a helmet) is shown. The wearable device 302 is adapted to be worn by the user when riding the recreational vehicle 340 to detect user's voice or speech during the ride. Detecting user's voice using a microphone 324 coupled to the wearable device 302 during the ride may be challenging because of sensitivity of the microphone 324 to ambient sounds, such as engine noise, tire noise, and wind noise. To increase the efficiency and efficacy of voice reception, the illustrative wearable device 302 further includes an accelerometer 326, which is described in detail below.

In the illustrative embodiment, the system 300 includes the wearable device 302 having a communication system 310 that is communicatively coupled to the recreational vehicle 340 wirelessly (e.g., via Bluetooth or WiFi). However, it should be appreciated that, in some embodiments, the wearable device 302 may be coupled to the recreational vehicle 340 via a wire. The system 300 may further include one or more wearable device 330 and/or one or more computing devices 360 (e.g., a mobile device, a server) that are communicatively coupled to the wearable device 302 via a network 350.

In the illustrative embodiment, the communication system 310 of the wearable device 302 includes a processor 312, a memory 314, an input/output (I/O) controller 316 (e.g., a network transceiver), a memory unit 318, an user interface 320, one or more speakers 322, one or more microphones 324, and an accelerometer 326, all of which may be interconnected via one or more address/data bus. Although the I/O controller 316 is shown as a single block, it should be appreciated that the I/O controller 316 may include a number of different types of I/O components. The user interface 320 may include one or more input devices that can receive user input (e.g., buttons, a touch pad, a keyboard).

The processor 312 as disclosed herein may be any electronic device that is capable of processing data, for example a central processing unit (CPU), a graphics processing unit (GPU), a system on a chip (SoC), or any other suitable type of processor. It should be appreciated that the various operations of example methods described herein (i.e., performed by the communication system 310) may be performed by one or more processors 312. The memory 314 may be a random-access memory (RAM), read-only memory (ROM), a flash memory, or any other suitable type of memory that enables storage of data such as instruction codes that the processor 312 needs to access in order to implement any method as disclosed herein. It should be appreciated that although only one processor 312 is shown, the communication system 310 may include multiple processors 312.

The communication system 310 may further include a database 328. As used herein, the term "database" may refer to a single database or other structured data storage, or to a collection of two or more different databases or structured data storage components. In the illustrative embodiment, the database 328 is part of the communication system 310. In some embodiments, the communication system 310 may access the database 328 via a network (e.g., a network 350). The database 328 may store data that is received from and/or to be transmitted to one or more communication systems of other wearable devices 330, a computing device 360, and one or more recreational vehicles 380. It should be appreciated that each of other wearable devices 330 includes a communication system similar to the communication system 310 of the wearable device 302.

In general, the computing device 360 may include any existing or future devices capable of receiving and/or transmitting data to and from the user. For example, the computing device may be, but not limited to, a mobile device, a smartphone, a tablet, wearable, smart glasses, a computer, a notebook, a laptop, or any other suitable computing device that is capable of communicating with the communication system 310 of the wearable device 302. It should be appreciated that, in some embodiments, the computing device 360 may be directly coupled to the wearable device 302 via a wire.

The communication system 310 may further include a number of software applications stored in memory unit 318, which may be called a program memory. The various software applications on the communication system 310 may include specific programs, routines, or scripts for performing processing functions associated with the methods described herein. Additionally or alternatively, the various software applications on the communication system 310 may include general-purpose software applications for data processing, database management, data analysis, network communication, web server operation, or other functions described herein or typically performed by a communication system of a wearable device (e.g., a helmet). The various software applications may be executed on the same computer processor or on different computer processors. Additionally, or alternatively, the software applications may interact with various hardware modules that may be installed within or connected to the communication system 310. Such modules may implement part of or all of the various exemplary method functions discussed herein or other related embodiments.

The one or more speakers 322 may be any electronic devices that are capable of producing sound in response to an electrical audio signal input. In the illustrative embodiment, the speakers 322 are positioned near the user's ears to transmit audible sound to the user. If the wearable device 302 is embodied as a helmet, the speakers 322 may be positioned inside the helmet near the user's ears to transmit audible sound to the user. For example, the electrical audio signal input may be received from the recreational vehicle 340 via the one or more speaker 322 for voice commands, phone communications, and/or radio communications (e.g., vehicle-to-vehicle communications). In some embodiments, the electrical audio signal input may be directly received from a communication system of another wearable device (e.g., 330) to receive communications or messages from another user. In other embodiments the communication system 310 of the wearable device 302 may be communicatively coupled to a user's mobile device (e.g., the computing device 360). In such cases, the electrical audio signal input may be directly received from a user's mobile device (e.g., the computing device 360) to, for example, deliver audio conversations during a phone call, play music, and/or play back a text message or email to the user via the one or more speaker 322.

The one or more microphones 324 may be any electronic devices that are capable of capturing sound and converting into an electrical audio output signal. In the illustrative embodiment, the microphone 324 may be mounted near the user's mouth to receive audible sound from the user. If the wearable device 302 is embodied as a helmet, the microphone may be mounted outside and/or inside the helmet near the user's mouth. For example, the electrical audio output signals from the one or more microphones 324 may be transmitted to the recreational vehicle 340 for voice commands, phone communications, and/or radio communications (e.g., vehicle-to-vehicle communications). The electrical audio output signal may be transmitted directly to a communication system of another wearable device (e.g., 330) of another user to deliver communication or message from the user to another user. Additionally, in some embodiments, the communication system 310 may directly communicate with the user's mobile device (e.g., the computing device 340) for phone communications and/or for creating a voice-to-text message or email to be sent to another computing device.

The accelerometer 326 may be any sensor that is capable of measuring frequency vibration. In the illustrative embodiment, the accelerometer 326 is positioned where the wearable device 302 is likely to be in contact with the user's head and/or neck. This allows the accelerometer 326 to capture vibrations of the user's head and/or neck to detect a voice or speech of the user. For example, if the wearable device 302 is embodied as a helmet, the accelerometer is mounted or embedded on an interior surface of the helmet and is positioned where the cheek of the user is likely to hit when wearing the helmet. Alternatively or additionally, if the helmet has a headphone or earmuffs (e.g., a noise cancelling headphone or earmuffs) inside the helmet, the accelerometer may be mounted or embedded in a padding of the ear of the earmuffs. However, it should be appreciated that, in some embodiments, the accelerometer may be positioned anywhere insider the helmet where the helmet is in contact with the user's body (e.g., user's head, face, and/or neck). It should also be appreciated that, in some embodiments, the accelerometer 326 may be positioned on a chinstrap of the wearable device 302. By mounting the accelerometer 326 in the wearable device or on a chinstrap that is in contact with the user's head and/or neck, audio frequencies produced by the user's vocal cords may be detected in real time. The accelerometer signals are minimally affected by ambient audio noise, such as the engine noise. In one example, the accelerometer 326 may be embodied as a low-noise, high-bandwidth 3-axis accelerometer with a time-division multiplexing slave interface. In such an example, the signal bandwidth may be 2340 hertz, and the supply voltage may be between 1.71 and 1.99 voltage.

The network 350 is any suitable type of computer network that functionally couples the communication system 310 of the wearable device 302 with another wearable device 330, and/or the computing device 360. In some embodiments, the network 350 may be any suitable type of computer network that functionally couples the recreational vehicle 340 to one or more computing devices 360 and/or one or more wearable devices. The network 350 may include a proprietary network, a secure public internet, a virtual private network and/or one or more other types of networks, such as dedicated access lines, plain ordinary telephone lines, satellite links, cellular data networks, or combinations thereof. In embodiments where the network 350 comprises the Internet, data communications may take place over the network 350 via an Internet communication protocol.

The network 350 may be, or include, any number of different types of communication networks such as, for example, a bus network, a short messaging service (SMS), a local area network (LAN), a wireless LAN (WLAN), a wide area network (WAN), a personal area network (PAN), the Internet, a P2P network, custom-designed communication or messaging protocols, and/or the like. Additionally, the network 350 may also include FM/AM radio, Family Radio Service (FRS) radio, General Mobile Radio Service (GMRS) radio, amateur radio, and/or the like. The network 350 may include a combination of multiple networks.

It should be appreciated that this diagram is merely an example, which should not unduly limit the scope of the claims. One of ordinary skill in the art would recognize many variations, alternatives, and modifications.

Figure 4:
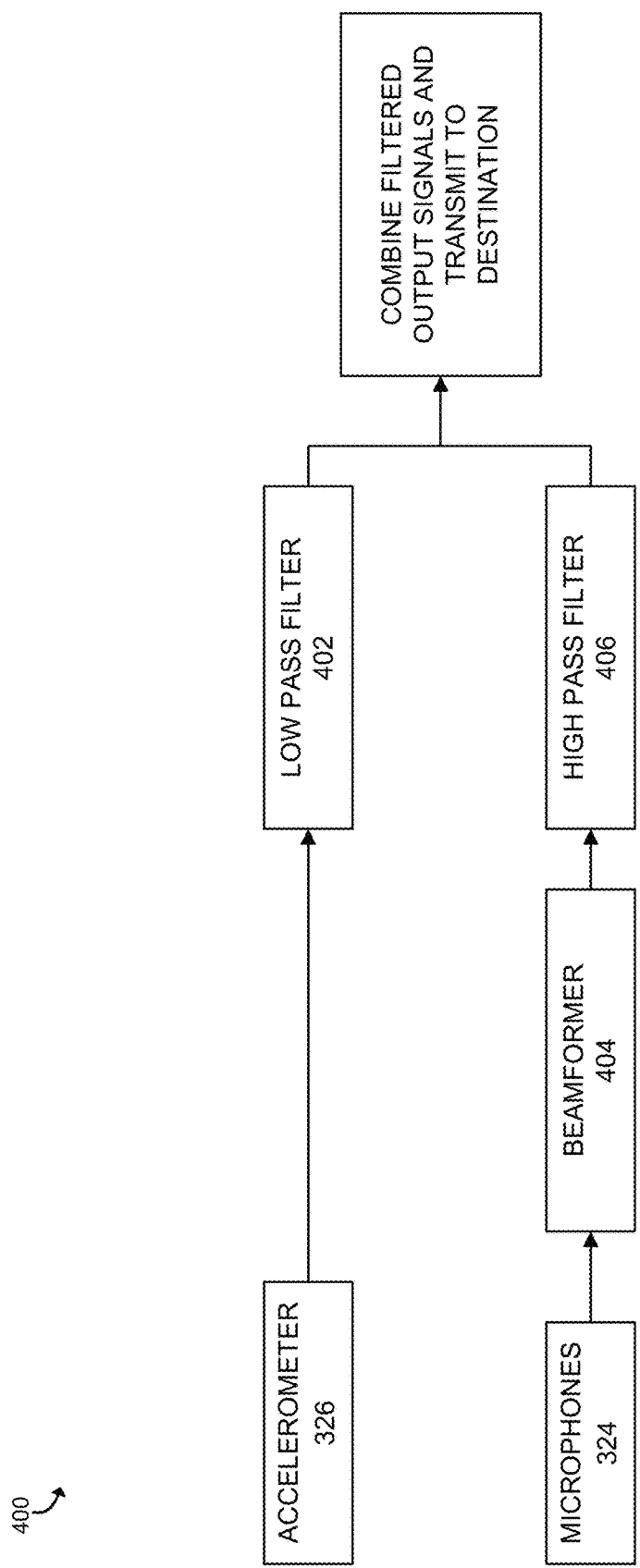
FIG. 4 illustrates a method for voice detection of the user using the wearable device of FIG. 3.

Referring now to FIG. 4, a computer-implemented method 400 for voice detection in the wearable device 302 using the accelerometer 326 and the microphones 324 is shown. In the illustrative embodiment, the method 400 is performed by the communication system 310 of the wearable device 302. As discussed above, detecting user's voice using a microphone coupled to a wearable device in a noisy environment may be challenging because of sensitivity of the microphone to ambient audio noise or environment noise, such as engine noise. However, unlike the audio output signal generated by the microphone, the accelerometer output signal is minimally affected by ambient audio noise since the accelerometer is configured to detect audio frequencies produced by the user's vocal cords in or near real-time. Based on the accelerometer data, the communication system 310 is able to detect whether the user is making sound and activates the microphone 324 to obtain the microphone data. In other words, the microphone 324 may be inactive or muted until the communication system 310 detects the voice or sound of the user. It should be appreciated that, in some embodiments, the microphone 324 may be always active. As such, the communication system 310 of the wearable device 302 utilizes the output signals from the microphones 324 and the accelerometer 326 of the wearable device 302 to detect a voice of the user more accurately.

As described above, the accelerometer 326 is configured to detect audio frequencies produced by the user's vocal cords in real-time. The detected frequencies can then be accentuated in the signal path of the microphones 324 to improve voice detection accuracy. In the illustrative embodiment, frequency detection and accentuation are done using a low pass filter 402, a beamforming 404, and a high pass filter 406. As shown in FIG. 4, the low pass filter 402 is connected to the accelerometer 326. Whereas, the high pass filter 406 is connected to the microphones 324 via a beamformer or a spatial filter 404.

The low pass filter 402 is configured to receive the accelerometer output signals generated by the accelerometer 326 to remove high frequency noise. In other words, the accelerometer data provides an audio representation of low frequencies of the voice of the user.

The high pass filter 406 is configured to receive the audio output signals generated by the microphones 324 of the wearable device 302 to remove low frequency noise (e.g., environment noise). To do so, the audio output signals from the microphones 324 are processed using a beamforming technique for directional signal reception to achieve spatial selectivity via the beamformer or spatial filter 404. It should be appreciated that a different type of beamforming technique may be used depending on how the microphone is mounted or aligned relative to the user's mouth.

Once the accelerometer output signals and the audio output signals are processed, the communication system 310 of the wearable device 302 is configured to combine the filtered output signals to detect the voice or speech of the user. In other words, the vibrations of user's head and/or neck detected by the accelerometer 326 is correlated to the sound captured by the microphones 324 to improve voice detection accuracy. The combined filtered output signals are transmitted to a destination via wired or wireless communication. The destination may include another wearable device, another vehicle, and/or a software application or a server that is performing the voice recognition.

It should be appreciated that, in some embodiments, the transmission of sound through the user's head may cause distortion in the accelerometer signals at high frequencies and, thus, the audio quality of the accelerometer signals may be more representative at lower frequencies. In such embodiments, the communication system may process accelerometer signals from an accelerometer alone without the audio output signals from the microphone to detect the voice of the user with the lower vocal frequency range, for example, 150 Hz to 1.5 kHz. Additionally, in such embodiments, the method 400 may be performed (i.e., using output signals from the accelerometer and the microphones) to detect a voice of the user with the higher end of the vocal talking range, for example 1.5 kHz to 4 kHz.

Figure 5:
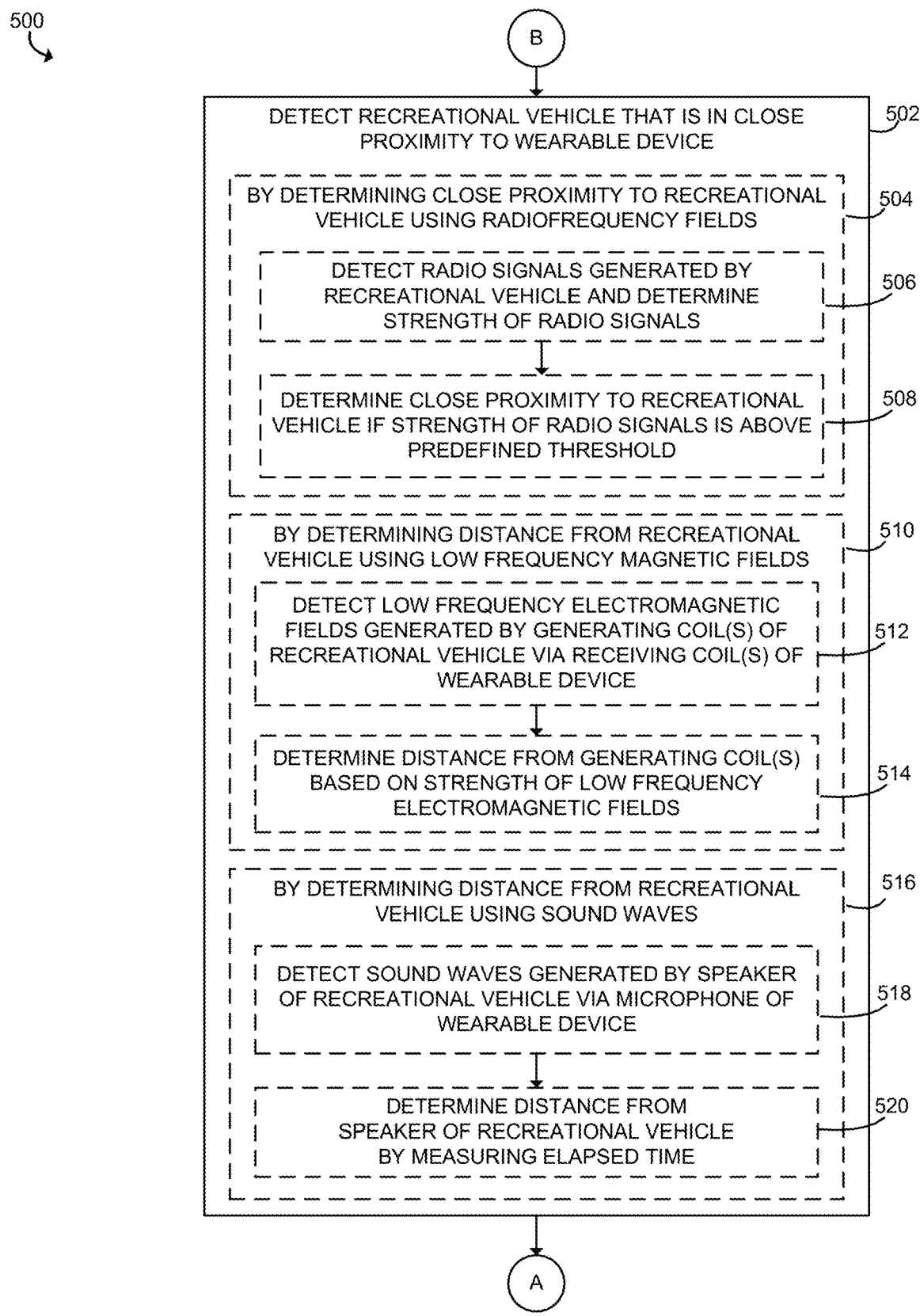
FIGS. 5 and 6 are a flow diagram illustrating a computer-implemented method for establishing a communication channel between a recreational vehicle and a wearable device that is in close proximity to the recreational vehicle.
Figure 6:
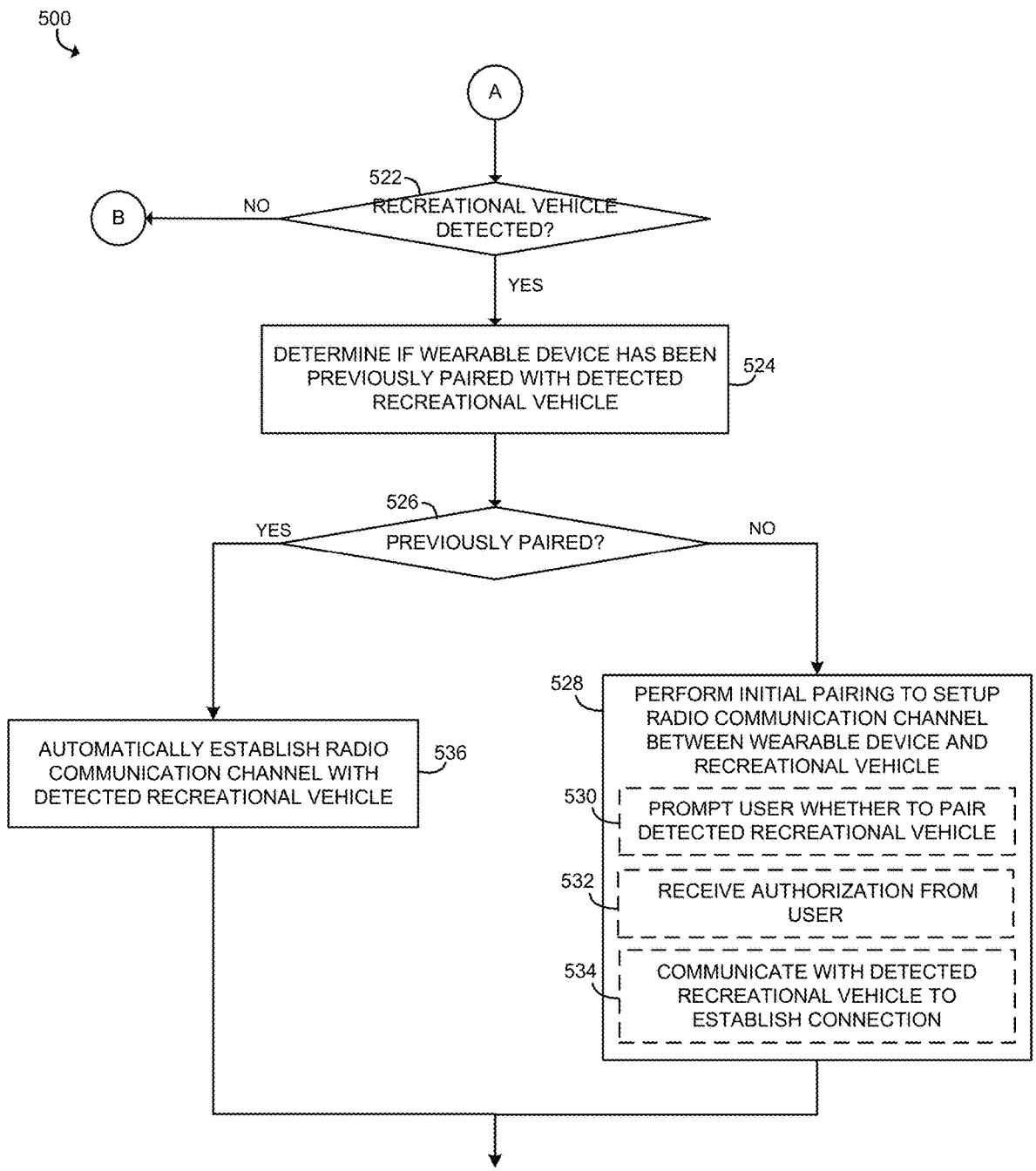

Referring now to FIGS. 5 and 6, a computer-implemented method 500 for establishing a communication channel between a wearable device (e.g., 110, 302) and a recreational vehicle (e.g., 140, 340) that is in close proximity to the wearable device is shown. In the illustrative embodiment, the communication channel may be formed to transfer audio data between the wearable device and the recreational vehicle. However, it should be appreciated that the communication channel may also be used to transmit instructions (e.g., vehicle commands) and/or information (e.g., a battery life of the wearable device).

In the illustrative embodiment, the method 500 is performed by a communication system (e.g., 120, 310) of a wearable device (e.g., 110, 302). In block 502, the wearable device 110, 302 detects a presence of a recreational vehicle that is in close proximity to the wearable device 110 to establish a communication channel between the detected recreational vehicle and the wearable device 110, 302. For example, the wearable device 110 may include a communication device that detects whether a recreational vehicle is in a predefined range of the communication device.

To do so, in some embodiments, the wearable device 110, 302 (e.g., the communication device of the wearable device) may determine that the wearable device 110, 302 is in close proximity to a recreational vehicle using radiofrequency fields generated by the recreational vehicle, as indicated in block 504. In such embodiments, the recreational vehicle generates and transmits radio signals, which may be detected by one or more nearby wearable devices. Each wearable device 110, 302 determines a strength of the detected radio signals to determine whether the wearable device 110, 302 is in close proximity to the recreational vehicle, as indicated in block 506. It should be appreciated that the shorter the distance between the wearable device 110, 302 and the recreational vehicle, the stronger the strength of the radio signals detected by the wearable device 110, 302. As such, if the wearable device 110, 302 determines that the strength of the radio signals is above a predefined threshold level, the wearable device 110, 302 determines that the wearable device 110, 302 is in close proximity to the recreational vehicle, as indicated in block 508. For example, to reliably detect a high signal strength that is above the predefined threshold level, the distance between the wearable device 110, 302 and the recreational vehicle may need to be less than one meter.

Additionally or alternatively, in some embodiments, the wearable device 110, 302 (e.g., the communication device of the wearable device) may determine that the wearable device 110, 302 is in close proximity to a recreational vehicle by determining a distance from a recreational vehicle using low frequency electromagnetic fields, as indicated in block 510. In such embodiments, the recreational vehicle generates low frequency electromagnetic fields (e.g., 250 KHz) by one or more generating coils located within the recreational vehicle. The low frequency electromagnetic fields may be detected by nearby wearable devices that have one or more receiving coils capable of detecting electromagnetic waves, as indicated in block 512. Each wearable device 110, 302 determines a distance from the generating coils of the recreational vehicle based on a signal strength of the low frequency electromagnetic fields, as indicated in block 514. It should be appreciated that the shorter the distance between the wearable device 110, 302 and the recreational vehicle, the stronger the signal strength of the low frequency electromagnetic fields detected by the wearable device 110, 302. As such, if the wearable device 110, 302 determines that the strength of the low frequency electromagnetic fields is above a predefined threshold level, the wearable device 110, 302 determines that the wearable device 110, 302 is in close proximity to the recreational vehicle that is generating the low frequency electromagnetic fields.

It should be appreciated that, in some embodiments, the recreational vehicle may have multiple generating coils within the recreational vehicle. In such embodiments, the wearable device 110, 302 may further determine a specific seating position of the wearable device 110, 302 inside the recreational vehicle by analyzing the directions of the multiple electromagnetic fields generated by the multiple generating coils. For example, the electromagnetic field generated by the generating coils in the dash board of the recreational vehicle may be used to determine whether the wearable device 110, 302 is in a front seat or a back seat, and the electromagnetic field generated by the generating coils on either side of the recreational vehicle may be used to determine whether the wearable device 110, 302 is position on the left or the right side of the recreational vehicle.

However, it should be appreciated that, in some embodiments, a directional finding or time of flight method may be used to determine whether the wearable device 110, 302 is in close proximity to a recreational vehicle.

Additionally or alternatively, in some embodiments, the wearable device 110, 302 (e.g., the communication device of the wearable device) may determine that the wearable device 110, 302 is in close proximity to a recreational vehicle by determining a distance from a recreational vehicle using sound waves, as indicated in block 516. In such embodiments, the recreational vehicle generates sound waves by one or more speaker of the recreational vehicle. The sound waves may be detected by nearby wearable devices that have one or more microphones capable of detecting sound waves, as indicated in block 518. Each wearable device 110, 302 determines a distance from the generating coils of the recreational vehicle based on an elapsed time of the sound waves using the speed of sound, as indicated in block 520. The elapsed time indicates a time duration between the time that the sound waves were transmitted from the recreational vehicle and the time the sound waves were received by the wearable device 110, 302. It should be appreciated that the shorter the distance between the wearable device 110, 302 and the recreational vehicle, the shorter the elapsed time determined by the wearable device 110, 302. As such, if the wearable device 110, 302 determines that the elapsed time is shorter than a predefined threshold level, the wearable device 110, 302 determines that the wearable device 110, 302 is in close proximity to the recreational vehicle that is generating the sound waves.

Similarly to the magnetic field, a specific seating position of the wearable device 110, 302 inside the recreational vehicle may be determined if the recreational vehicle has multiple speakers for generating sound waves. In such embodiments, the wearable device 110, 302 may analyze the directions of the sound waves generated by the multiple speakers to determine the specific seating position.

In some embodiments, the wearable device 110 may communicate with a seat of the recreational vehicle to determine the seating position of the wearable device within the recreational vehicle. For example, as described further below in FIG. 10, each seat of the recreational vehicle may include a wireless charging pad to wirelessly charge a wearable device that is in close proximity to the charging pad of the seat. In such embodiments, by using a unique identification of the charging pad, a specific seating position of the wearable device 110, 302 inside the recreational vehicle may be determined.

It should be appreciated that the wearable device 110, 304 may enable a directional communication based on the seating position. In other words, the wearable device 110, 304 may transmit sound to the user of the wearable device via one or more speakers of the wearable device to indicate a direction where the sound actually is coming from. For example, if a passenger is sitting in a passenger seat of a recreational vehicle and is talking to a driver in a driver seat that is positioned at the left side of the passenger seat, the voice of the passenger is captured and communicated to the driver. To indicate that the sound is coming from the right side of the driver, the sound in the left ear is delayed to account for the sound travelling around the head. It should be appreciated that the amount of delay changes depending on a position of the driver's head (i.e., a distance between the drivers' ear and the source of the sound).

In block 522, the wearable device 110, 302 determines whether the wearable device 110, 302 detected a recreational vehicle that in close proximity to the wearable device 110, 302. If the wearable device 110, 302 determines that the recreational vehicle is not in close proximity to the wearable device 110, 302, the method 500 loops back to block 502 to continue to determine a presence of a recreational vehicle in close proximity to the wearable device 110, 302. If, however, the wearable device 110, 302 determines that the recreational vehicle is in close proximity to the wearable device 110, 302, the method 500 advances to block 524.

In block 524, the wearable device 110, 302 determines if the wearable device 110, 302 has been previously paired with the detected recreational vehicle. If the wearable device 110, 302 determines that the wearable device 110, 302 has not been previously paired with the detected recreational vehicle, the method 500 advances to block 528 to perform an initial pairing to setup a communication channel between the wearable device 110, 302 and the detected recreational vehicle. To do so, the wearable device 110, 302 may prompt a user (e.g., a wearer) of the wearable device 110, 302 to pair with the detected recreational vehicle that is in in close proximity to the wearable device 110, 302, as indicated in block 530. Upon receiving an authorization from the user in block 532, the wearable device 110, 302 communicates with the detected recreational vehicle to establish a communication channel, as indicated in block 534.

It should be appreciated that, in some embodiments, the detected recreational vehicle may prompt a user (e.g., a driver/rider) of the recreational vehicle (e.g., on a display screen of the recreational vehicle) whether to pair with the wearable device 110, 302 that is in close proximity to the recreational vehicle. In such embodiments, upon receiving an authorization from the user, the recreational vehicle communicates with the wearable device 110, 302 to establish a communication channel.

Referring back to block 526, if the wearable device 110, 302 determines that the wearable device 110, 302 has been previously paired with the detected recreational vehicle, the method 500 skips ahead to block 536 to automatically establish a radio connection channel with the detected recreational vehicle. The method 500 allows the wearable device 110, 302 to automatically establish a communication link with the recreational vehicle when the wearable device 110, 302 comes near or is within the recreational vehicle without needing to perform multiple steps of a pairing process (e.g., blocks 528-534). It should be appreciated that the wearable device 110, 302 may automatically connect with another wearable device that is also paired with the same recreational vehicle when both wearable devices are near or within the recreational vehicle. This may allow direct communication between the wearable devices that are near or within the same recreational vehicle.

It should be appreciated that, although the method 500 is performed by the wearable device 110, 302 to detect a presence of a recreational vehicle that is in close proximity to the wearable device 110, 302 to establish a communication channel between the wearable device 110, 302 and the detected recreational vehicle, a similar method may be performed by a recreational vehicle (e.g., 140, 340) to detect one or more wearable devices that are in close proximity to the recreational vehicle to establish a communication channel between the recreational vehicle and the detected wearable devices. In such embodiments, the recreational vehicle may detect a specific seat position of the wearable device inside the recreational vehicle by using multiple generating coils and/or speakers within the recreational vehicle. For example, the generating coils in the dash board of the recreational vehicle may be used to determine whether the wearable device is in a front seat or a back seat, and the generating coils on either side of the recreational vehicle may be used to determine whether the wearable device is position on the left or the right side of the recreational vehicle.

Figure 7:
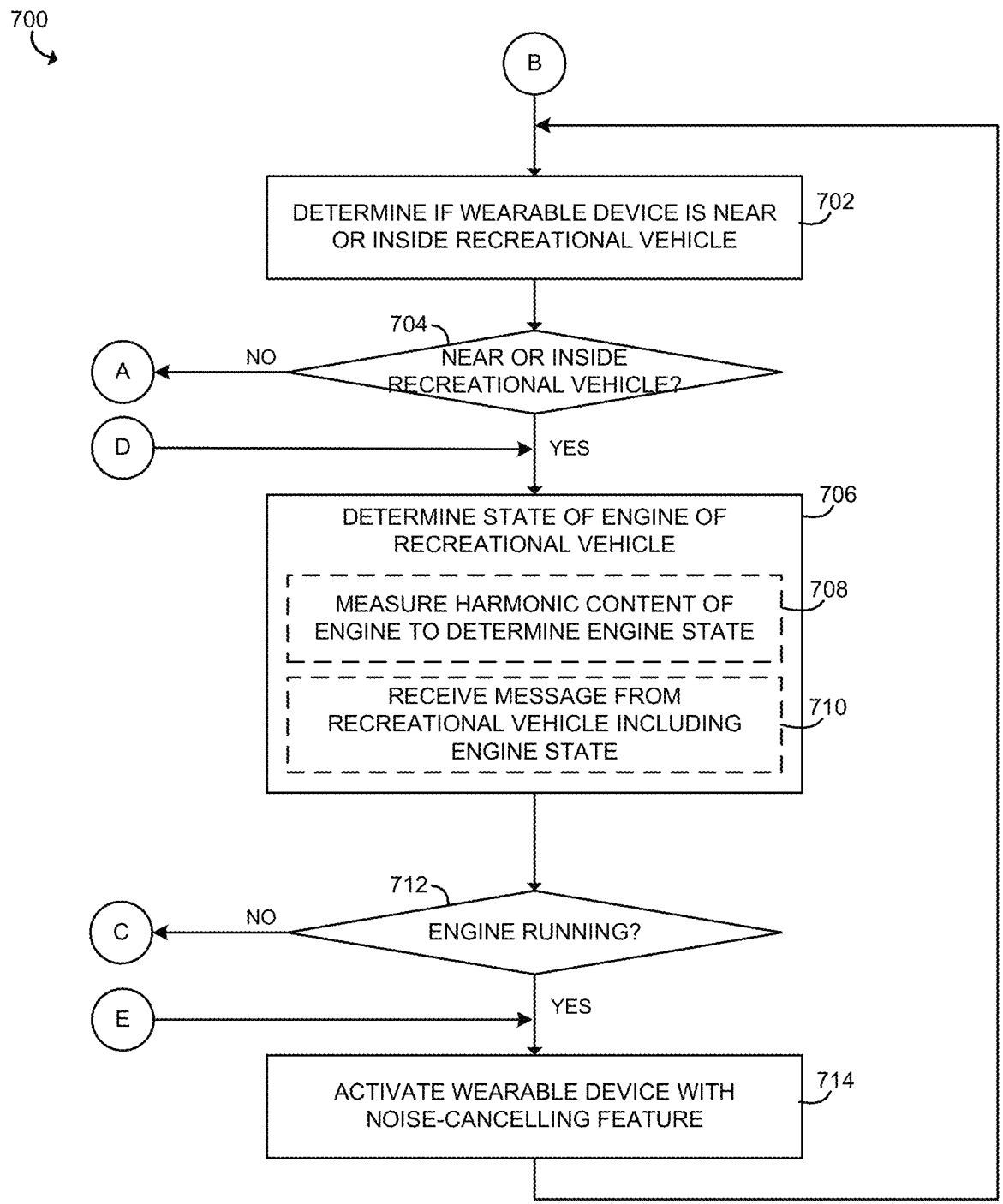
FIGS. 7-9 are a flow diagram illustrating a computer-implemented method for minimizing a battery power usage of a wearable device using a location of the wearable device and vehicle state information.
Figure 8:
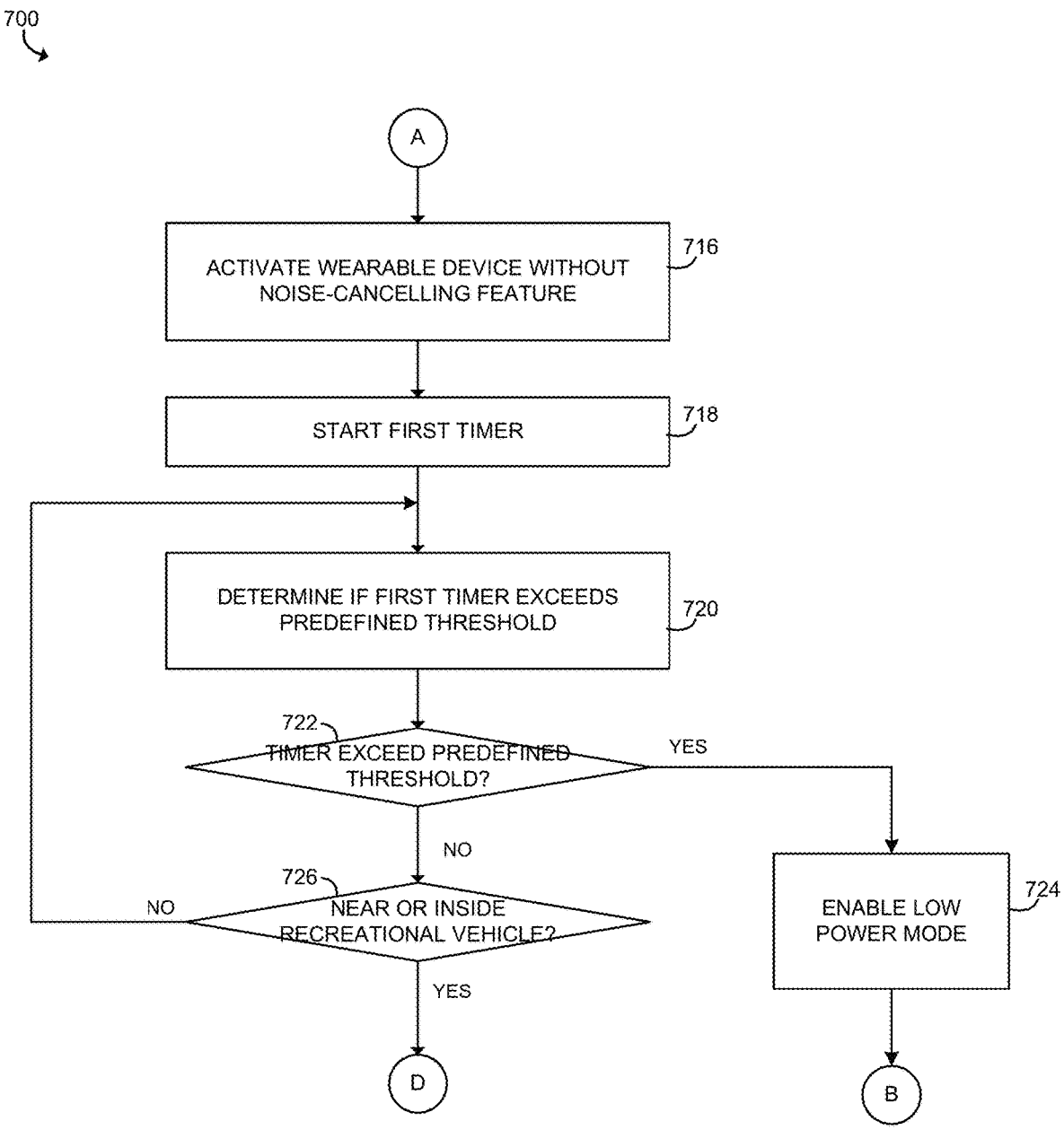
Figure 9:
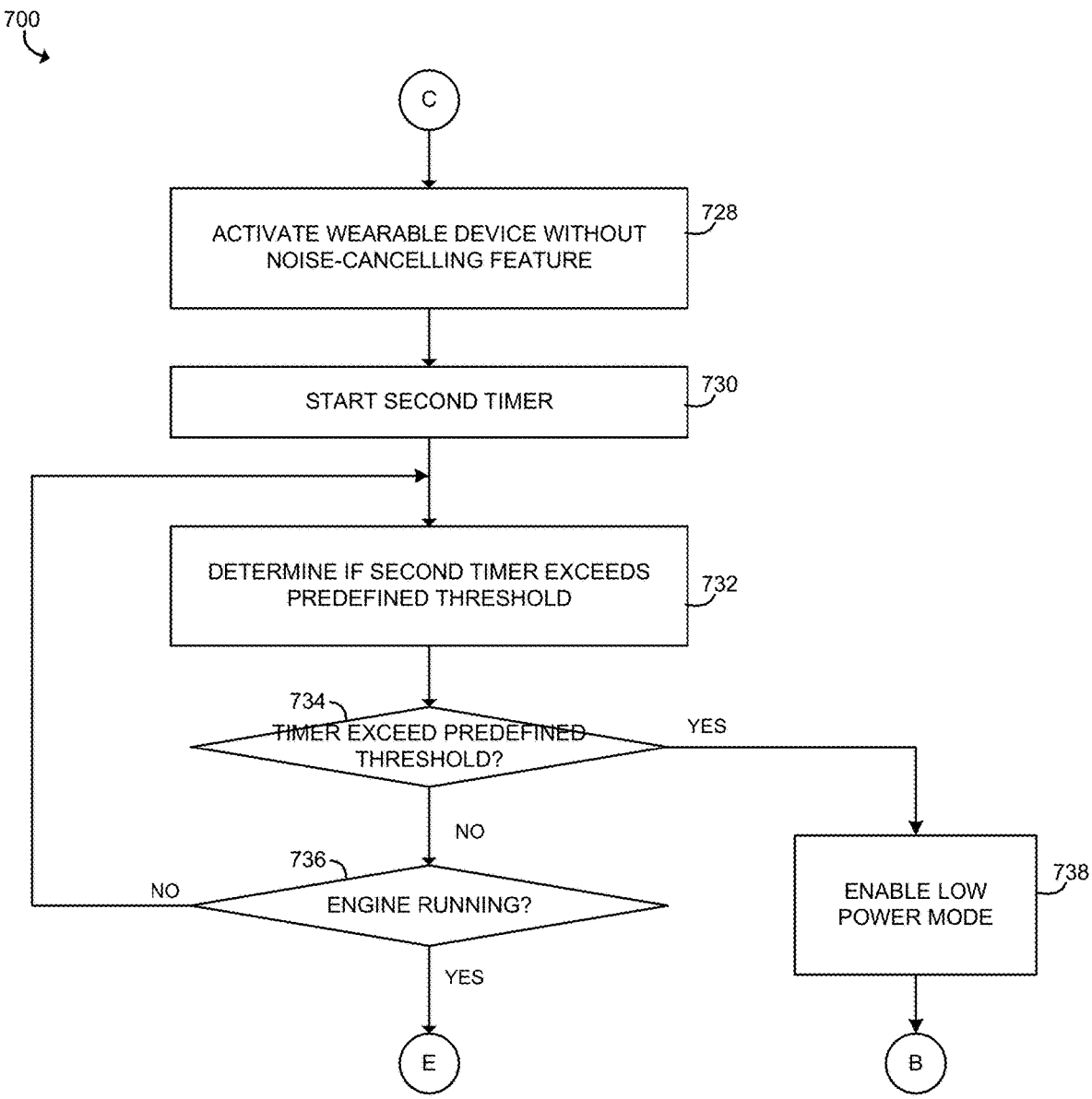

Referring now to FIGS. 7-9, a computer-implemented method 700 for minimizing a battery power usage of a wearable device (e.g., 110, 302, 1010). Constantly supplying battery power to a wearable device may waste a battery of the wearable device. Generally, a wearable device relies on a user of the wearable device to control the power usage of the wearable device. For example, the user may turn on the power of the wearable device when the user needs to use the wearable device to, for example, transmit voice commands to a recreational vehicle, listen to music, and/or participate in telephone or radio communications. The user may then turn off the power of the wearable device to preserve a battery of the wearable device when the wearable device is not in use. However, not only is burdensome for the user to turn on and off the wearable device, but the user may forget to turn it off when it is not in use, thus, unnecessarily draining the battery of the wearable. Additionally or alternatively, the wearable device may be turned off if a predefined time period has passed after a detection of an end of an audio content input. However, in this case, the wearable device may not account for the use of the wearable device without audio content or with intermittent content (e.g., an intercom).

As such, in the illustrative embodiment, a wearable device (e.g., 110, 302, 1010) is configured to minimize a battery power usage by automatically controlling, periodically or continually, an activation of one or more features of the wearable device. For example, if the wearable device is not in use after a predefined period of time after the wearable device is turned on, the wearable device may enable a low power mode to minimize a battery usage. The low power mode may include disabling noise-cancelling feature, reducing radio traffic, and/or disabling one or more features that may unnecessarily consume the battery.

The method 700 is performed by the wearable device. In block 702, the wearable device determines if the wearable device is near or inside a recreational vehicle. To do so, blocks 502-520 of FIG. 5 of the method 500 may be performed to determine whether the wearable device is in close proximity to a recreational vehicle. As described in blocks 502-520, the wearable device may determine its location relative to a recreational vehicle by using radio frequency fields, magnetic fields, and/or sound waves. If the wearable device determines that the wearable device is near or inside a recreational vehicle, the method 700 advances to block 706.

In block 706, the wearable device communicates with the recreational vehicle to determine a state of an engine of the detected recreational vehicle. To do so, the wearable device may periodically or continually measure a harmonic content of the engine for a predefined period of time to determine the engine state (e.g., whether the engine is turned on or off), as indicated in block 708. Additionally or alternatively, the wearable device may receive a message (e.g., a direct radio signal) from the recreational vehicle that includes an engine state, as indicated in block 710.

If the wearable device determines that the engine of the recreational vehicle is running in block 712, the method 700 advances to block 714 to activate the wearable device with a noise-cancelling feature to remove environment noise (e.g., engine noise, tire noise, wind noise) from audio data captured by a microphone(s) of the recreational vehicle. If, however, the wearable device determines that the engine of the recreational vehicle is off, the method 700 skips ahead to block 728 of FIG. 9, which is described further below.

Referring back to block 704, if the wearable device determines that the wearable device is not near or insider a recreational vehicle, the method 700 skips ahead to block 716 of FIG. 8. In block 716, the wearable device activates the wearable device without the noise-cancelling feature. In other words, if the wearable device is not near or inside a recreational vehicle, the wearable device determines that the wearable device is not being used for riding of a recreational vehicle. As such, the noise-cancelling feature of the wearable device to cancel environment noise (e.g., engine noise, tire noise, wind noise) need not be activated. It should be appreciated that, by inactivating the noise-cancelling feature, the usage of the battery of the wearable device may be reduced.

Subsequently, the wearable device starts a first timer and determines if the first timer exceeds the first predefined threshold, as indicated in blocks 718 and 720, respectively. If the wearable device determines that the first timer (i.e., the elapsed time) exceeds the first predefined threshold in block 722, the wearable device determines that the wearable device is not in use and, thus, the wearable device is no longer needed to be activated. Subsequently, the method 700 advances to block 724 to enable the low power mode of the wearable device to minimize the battery power usage. Additionally, in some embodiments, the low power mode of the wearable device may be enabled if the wearable device has no movement for a predefined period of time based on sensor data generated by one or more sensors of the wearable device.

If, however, the wearable device determines that the first timer does not exceed the first predefined threshold, the method 700 advances to block 726 to determine whether the location of the wearable device relative to a recreational vehicle has changed. If the wearable device determines that the wearable device is still not near or inside the recreational vehicle, the method 700 loops back to block 720 to continue determining whether the elapsed time exceeds the first predefined threshold. If, however, the wearable device determines that the wearable device is now near or inside the recreational vehicle, the method 700 loops back to block 706 to determine whether the detected recreational vehicle is turned on by determining a state of the engine of the recreational vehicle, as described above.

Referring back to block 712, if the wearable device determines that the engine is not running, the method 700 advances to block 728 of FIG. 9. In block 728, the wearable device activates the wearable device without the noise-cancelling feature. In other words, if the engine of the recreational vehicle is not running, the wearable device determines that the wearable device is not being used for riding of a recreational vehicle. As such, the noise-cancelling feature of the wearable device to cancel environment noise (e.g., engine noise, tire noise, wind noise) need not be activated. Again, by inactivating the noise-cancelling feature, the usage of the battery of the wearable device may be reduced.

Subsequently, the wearable device starts a second timer and determines if the second timer exceeds the second predefined threshold, as indicated in blocks 730 and 732, respectively. If the wearable device determines that the second timer (i.e., the elapsed time) exceeds the second predefined threshold in block 734, the wearable device determines that the wearable device is not in use and, thus, the wearable device no longer needed to be activated. As such, the method 700 advances to block 738 to enable the low power mode of the wearable device to minimize the battery power usage.

If, however, the wearable device determines that the second timer does not exceed the second predefined threshold, the method 700 advances to block 736 to determine whether the engine state of the recreational vehicle has changed (i.e., the engine of the recreational vehicle is running). If the wearable device determines that the recreational vehicle is still not running, the method 700 loops back to block 732 to continue determining whether the elapsed time exceeds the second predefined threshold. If, however, the wearable device determines that the recreational vehicle is now running, the method 700 loops back to block 714 to activate the wearable device with the noise-cancelling feature.

Figure 10:
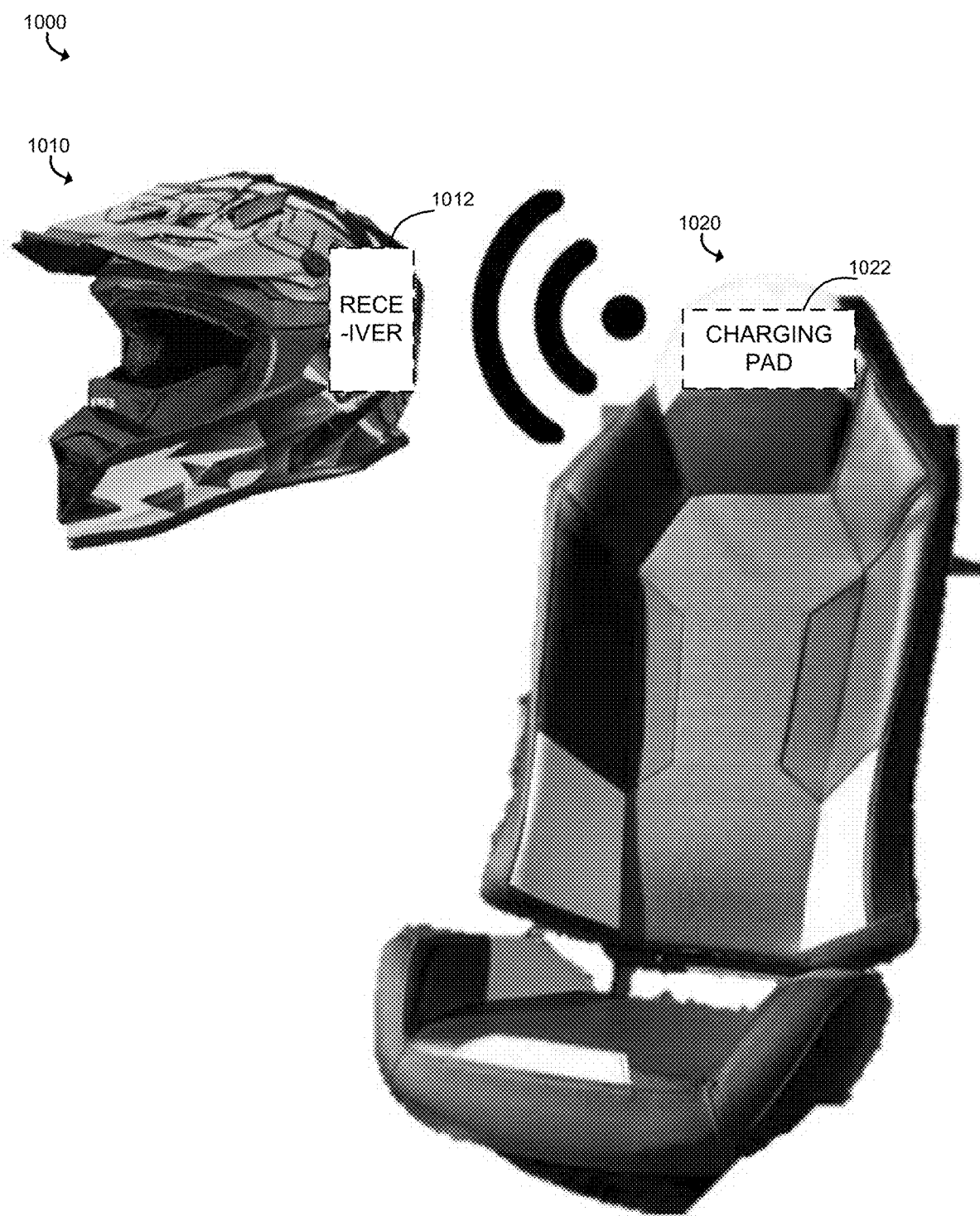
FIG. 10 illustrates a system for wirelessly charging a wearable device while riding a recreational vehicle.

Referring now to FIG. 10, a system 1000 for wirelessly charging a wearable device 1010 (e.g., a helmet) while riding a recreational vehicle (e.g., 140, 340) is shown. To do so, the recreational vehicle includes a charging pad 1022 (e.g., a transmission coil) for generating a magnetic field, and the wearable device 1010 includes a receiver 1012 for detecting the magnetic field and charging a battery (or providing operating power) to the wearable device 1010 when the magnetic field is detected. By providing a wireless charging capability of the wearable device 1010 with the recreational vehicle during the ride, the user need not worry about charging the wearable device 1010 in advance and is free of any cords that may need to be connected to the recreational vehicle for wire charging. In the illustrative embodiment, the wirelessly charging method includes resonance wireless charging, which allows the wearable device 1010 to be charged over a small distance from the charging pad 1022 of the recreational vehicle. However, in some embodiments, it may utilize any other wireless charging method to provide power from the recreational vehicle to the wearable device.

In the illustrative embodiment, the charging pad 1022 is embedded in a headrest of the seat 1020 of the recreational vehicle, while the receiver 1012 is embedded at the back of the wearable device 1010. This allows the receiver 1012 to be positioned in close proximity to the charging pad 1022 for wireless charging when a user (e.g., a wearer) of the wearable device 1010 is on the recreational vehicle. However, it should be appreciated that, in some embodiments, the charging pad 1022 may be embedded in, mounted on, or otherwise attached to any portion of the recreational vehicle, and the receiver 1012 may be embedded in, mounted on, or otherwise attached to any portion of the wearable device 1010 as long as the receiver 1012 is coupled to a battery of the wearable device 1010.

Figure 11:
FIG. 11 is an example screenshot of a display screen of a recreational vehicle when a user of the recreational vehicle is not following a leading recreational vehicle.

Referring now to FIG. 11, an example screenshot 1100 of a display screen of a recreational vehicle when a user (e.g., a driver/rider) of the recreational vehicle is not following a leading recreational vehicle is shown. When users (drivers/riders) are travelling together on a separate recreational vehicle, the recreational vehicles of the users may communicate with one another to make sure that they are generally travelling together. To do so, in the illustrative embodiment, the users designates one of their recreational vehicles as a leading recreational vehicle, and the non-leading recreational vehicles are guided toward the leading recreational vehicle. This allows the users to ride freely without worrying about losing his or her group members.

In the illustrative embodiment, a non-leading recreational vehicle 1110 displays its current location 1110 and a current location of a leading recreational vehicle 1120 on a map. The non-leading recreational vehicle further displays relative locations of the other non-leading recreational vehicles in the group, as shown in a section 1130 of the display screen. If the non-leading recreational vehicle 1110 detects that the non-leading recreational vehicle 1110 is not following a leading recreational vehicle, the non-leading recreational vehicle 1110 displays a visual warning alert 1140 on the display screen to catch the user's attention. For example, the non-leading recreational vehicle 1110 determines that it is not following the leading recreational vehicle if it is outside of a predefined threshold distance from the travel route of the leading vehicle 1120. It should be appreciated that the predefined threshold distance may be set by the user of the non-leading recreational vehicle 1110.

Additionally, the non-leading recreational vehicle 1110 may also play a warning sound via one or more speakers of the non-leading recreational vehicle 1110 to alert the user that the user is not following the leading recreational vehicle 1120. In some embodiments, the non-leading recreational vehicle 1110 may reduce a volume of any audio sounds currently playing via the speaker(s) when playing the warning sound. Such visual and/or audio alerts keep the users in the group to travel together toward the generally the same direction as the leading recreational vehicle. It should be appreciated that, in some embodiments, the visual and/or audio alerts may be silenced and/or disabled.

Figure 12:
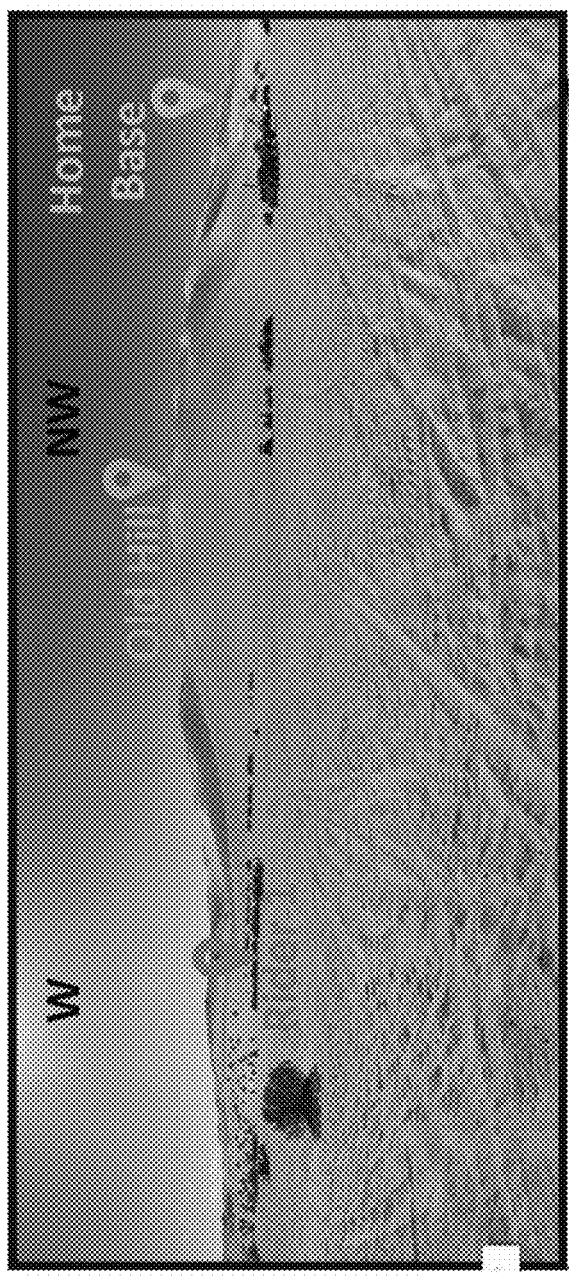
FIG. 12 is an example screenshot of a display screen of a recreational vehicle having augmented reality technology.

Referring now to FIG. 12, an example screenshot 1200 of a display screen of a recreational vehicle (e.g., 140) is shown. The illustrative recreational vehicle is configured to add point of interest markers in augmented reality to a live surrounding view of the environment on the display screen to assist with navigation during a ride. To do so, the illustrative recreational vehicle includes an augmented reality system, surround view cameras, a compass, and a communication system that provides vehicle-to-vehicle communication of GPS coordinates of its respective location.

In certain riding conditions, there is not clearly defined trails. Users riding recreational vehicles in an open environment without clearly defined trails (e.g., sand dunes, open water, and open frozen lakes) generally care about a final destination location but do not require a pre-determined route to get to the destination. In such cases, the augmented reality system of the recreational vehicle may allow the user to navigate based off of point of interest locations (e.g., a destination location, a start location, a geographical location, and/or other user's location). Such a system allows the user to move toward the general direction of the final destination without having to affix on a pre-determined route.

For example, if a user is riding a recreational vehicle in sand dunes, the recreational vehicle may display on a display screen of the recreational vehicle a present view of the environment in a direction that the user is travelling. It should be appreciated that this view is similar to the scenery that the user is viewing when riding the recreational vehicle at that moment. The recreational vehicle may further determine the present location of Rider 1 (i.e., another user of another recreational vehicle), Old Hill (i.e., an interest location), and Home Base (i.e., may be a destination location and/or a start location) relative to the recreational vehicle and overlay those locations in the direction the present view of the environment is shown in the display screen. The example of the display screen is shown in the screenshot 1200. This allows the user to gauge general direction to get to such locations.

In some embodiments, the augmented reality feature may be implemented in a wearable device that is communicatively coupled to a recreational vehicle. For example, the wearable device may be a helmet, a head-up display, goggles, glasses, contact lenses, face shield, or any other wearable device capable of displaying augmented reality elements. In such embodiments, the screenshot 1200 may be displayed on a transparent display of the wearable device.

It should be appreciated that, in other embodiments, the augmented reality feature may be implemented in a wearable device of a passenger of recreational vehicles for gamification during the ride. To do so, the wearable device may include one or more cameras mounted on the exterior of the wearable device to capture the live stream of the environment. In such embodiments, augmented reality elements of a game are added to a live view on a transparent display of the wearable device. The user may play the game by the movement of the user's head and/or using a controller device (e.g., a handheld controller). In some embodiments, the controller device (e.g., a turret, an arcade-style controller) may be mounted on a passenger grab handle and may be detachable from the grab handle. It should be appreciated that multiple wearable devices of passengers of one or more recreational vehicles may communicate with one another to participate in the same game. It should be appreciated that, in some embodiments, the driver of the recreational vehicle may participate in the game.

Figure 13:
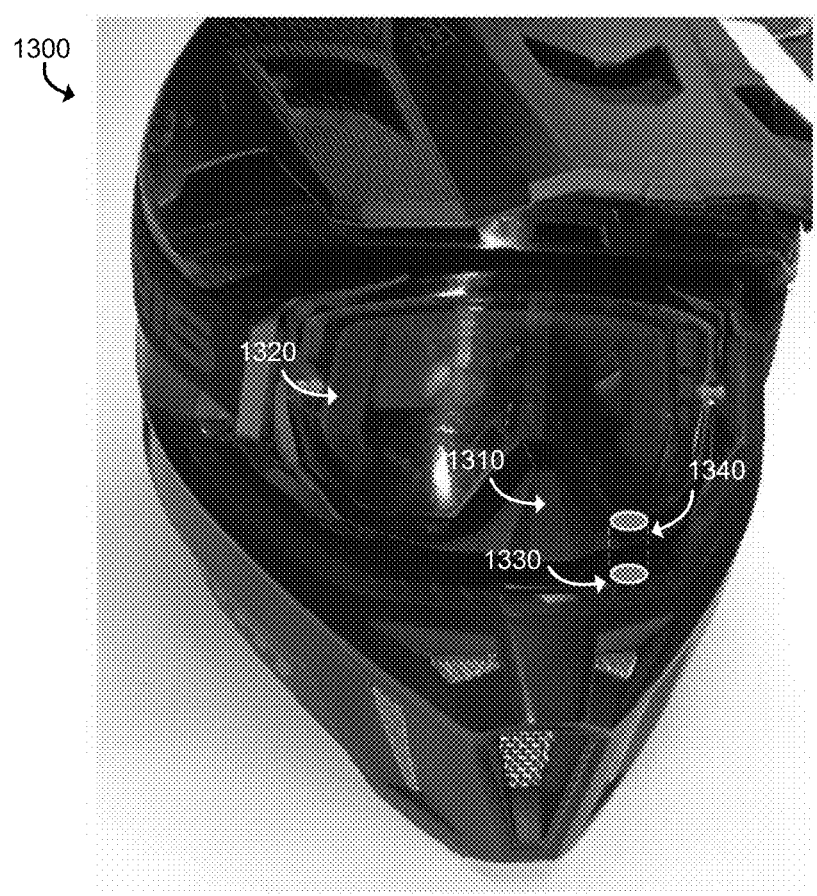
FIG. 13 is an exemplary helmet with a goggle light pipe indicator.

Referring now to FIG. 13, an exemplary helmet 1300 with a goggle light indicator is shown. The goggle light indicator 1310 is adapted to communicate with a rider, who is wearing the helmet 1300 and a goggle 1320. To do so, the goggle light indicator 1310 includes a light emitting diode (LED) 1330 embedded in the helmet 1300 and a light pipe 1340 embedded in the goggle 1320. In the illustrative embodiment, the goggle 1320 is removable from the helmet 1300. However, in some embodiments, the goggle 1320 may be integrated into and part of the helmet 1300.

The light pipe 1340 is adapted to transfer light from the helmet mounted LED 1330 into the field of view of the rider on the goggle 1320. In the illustrative embodiment, the light pipe 1340 is made of acrylic or polycarbonate. However, it should be appreciated that the light pipe 1340 may be made of any material that has a light-reflective property. The light pipe 1340 is configured to provide an indication or a notification to the rider. For example, the LED 1330 may emit light in response to detecting a voice activity. Additionally or alternatively, the LED 1330 may emit light to indicate that a ride partner is out of a communication range or that a distance between the rider and the ride partner exceeds a predefined threshold. It should be appreciated that the goggle light indicator 1310 is used to indicate various notifications associated with a vehicle and/or a mobile device of the rider.

In some embodiments, the LED 1330 may illuminate with a particular blinking pattern to indicate a certain type of indication or notification. In other words, different blinking patterns may be associated with different indications or notifications. In such embodiments, the rider may customize the blinking patterns on the mobile device and/or the vehicle. Although only one LED and one light pipe are illustrated in FIG. 13, in some embodiments, the goggle light indicator 1310 may include multiple LEDs with respective light pipes. Each LED and light pipe may be associated with a different type of indication or notification. Additionally or alternatively, multiple LEDs may be configured, such that a combination of LEDs (e.g., a number of emitted lights or a light pattern) is associate with a certain type of indication or notification. Additionally, in some embodiments, each of the LEDs may have a different color of the light representing a particular type of indication or notification. In such embodiments, the color associated with indication or notification may be configurable by the rider on the mobile device and/or the vehicle.

Figure 14:
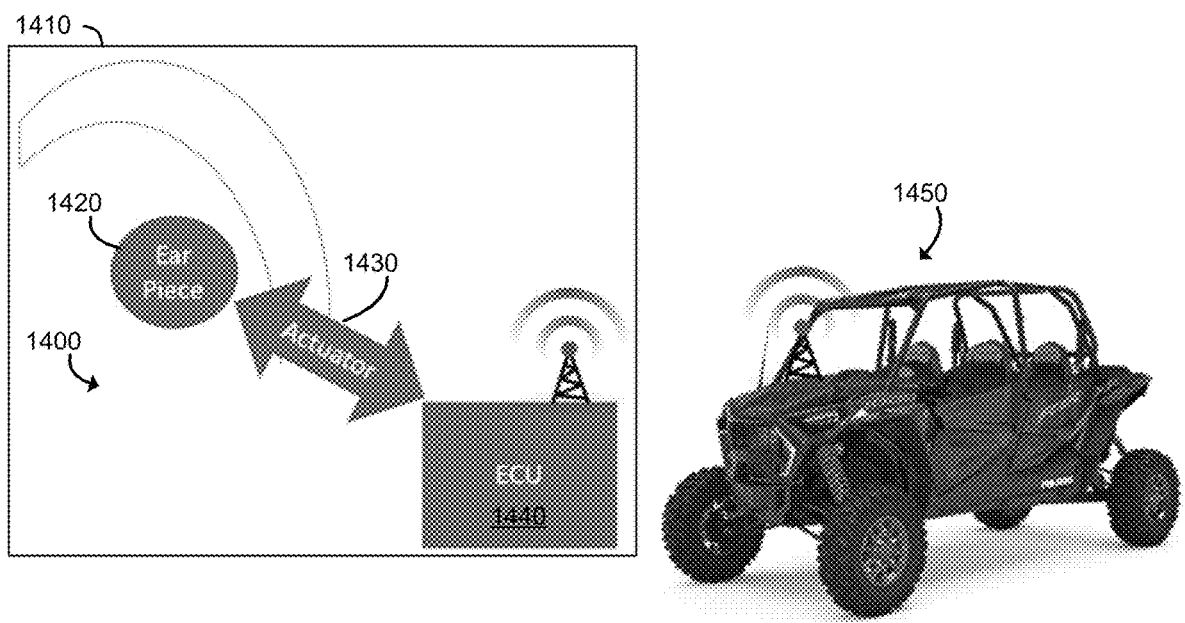
FIG. 14 is a simplified block diagram of an earpiece actuation system of a helmet.

Referring now to FIG. 14, a smart earpiece actuation system 1400 of a helmet 1410 of a rider of a vehicle 1450 is shown. The helmet 1410 includes a set of earpieces 1420, a set of actuators 1430, and an electronic control unit (ECU) 1440 communicatively coupled to the set of actuators 1430. Each actuator 1430 is associated with a respective earpiece 1420 to control positions of the earpieces 1420 relative to the rider's ears or head. However, it should be appreciated that, in some embodiments, a single actuator may control both earpieces 1420. The ECU 1440 is configured to communicate with the vehicle 1450 to receive or obtain a vehicle state of the vehicle 1450 in real-time or in near real-time to control the actuators 1430 associated with earpieces 1420 of the helmet 1410. For example, the vehicle state includes a gear position (e.g., drive gear, neutral gear, and park), an engine speed, a vehicle speed, vehicle acceleration, and/or vehicle deceleration. The automatic control of the relative position of the earpieces based on the vehicle state may improve the rider's overall riding experience.

As an example, when the rider puts on the helmet 1410 and the vehicle is not turned on or the gear is in a park position, the ECU 1440 does not activate the actuators 1430. When the rider shifts the vehicle 1450 to a drive gear (e.g., H/L or 1-6), the ECU 1440 automatically activates the actuators 1430 to push the earpieces 1420 into the rider's ears. This reduces an amount of noise (e.g., engine noise, tire noise, wind noise) entering the earpieces 1420 that may hinder the rider's ability to hear the sounds coming from one or more speakers (e.g., speakers within the earpieces 1420) of the helmet 1410 during rides. It should be appreciated that, in some embodiments, the ECU 1440 may adjust the positions of the actuators 1430 based on an engine speed, a vehicle speed, a vehicle acceleration, and/or a vehicle deceleration to further increase or decrease how hard the earpieces are being pressed against the rider's ears or head. When the rider shifts back out of the drive gear (e.g., to a neutral gear or a park position), the ECU 1440 automatically activates the actuators 1430 to move the earpieces 1420 back away from the rider's ears. This allows the rider to easily hear the environment sounds (e.g., talking). This may also allow the rider to easily remove the helmet 1410.

Figure 15:
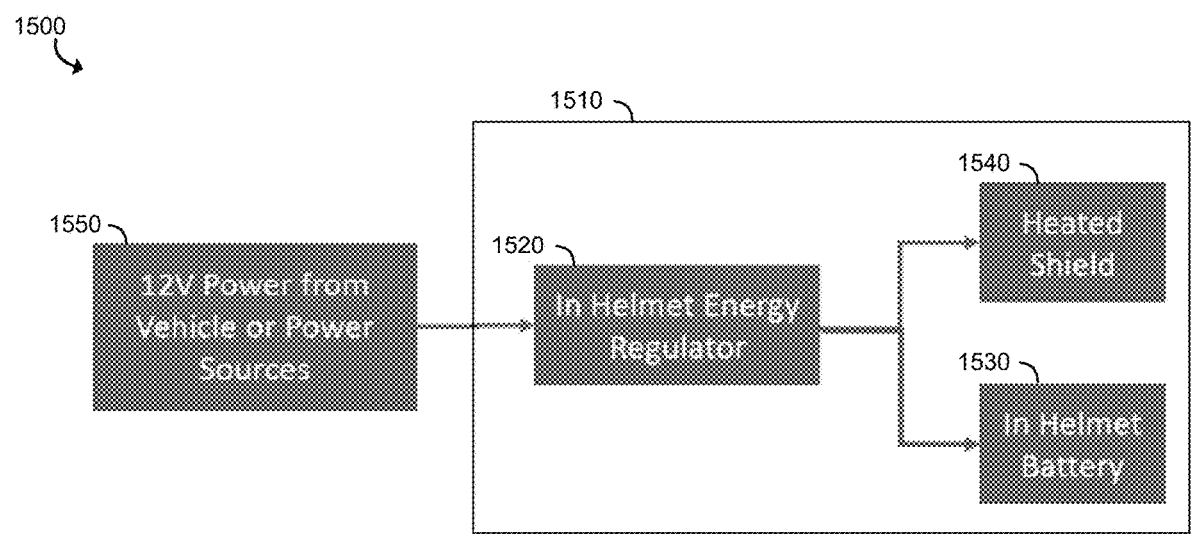
FIG. 15 is a simplified block diagram of a helmet energy management system of a helmet.

Referring now to FIG. 15, an exemplary smart helmet energy management system 1500 of a helmet 1510 of a rider of a vehicle is shown. In the illustrative embodiment, the helmet 1510 includes an in-helmet energy regulator 1520, an in-helmet battery 1530, and a heated shield 1540.

Generally, smart helmets include various components that need power to function. For example, in the illustrative embodiment, the helmet 1510 includes a heated shield that needs power to provide heat to a shield of the helmet 1510. However, in cold weather conditions, the in-helmet battery 1530 may have limited capabilities with lower power output and energy content. This yields to a lower run time of the heated shield 1540. In order to provide sufficient power output to the helmet 1510 during rides in various weather conditions, the helmet 1510 may be connected to an external power source 1550 via the in-helmet energy regulator 1520 of the helmet 1510. In the illustrative embodiment, the external power source 1550 is 12-voltage power from the vehicle or other power sources (e.g., a portable power bank). The in-helmet energy regulator 1520 is configured to determine a battery level of the in-helmet battery 1530 and control a power distribution to charge, maintain, and supplement energy to the heated shield 1540, other components of the helmet 1510, and/or other components that are coupled to the helmet 1510 (e.g., a heated garment) that need power.

For example, if the in-helmet energy regulator 1520 determines that the battery level of the in-helmet battery 1530 is below a threshold level, the in-helmet energy regulator 1520 may use the external power source 1550 to charge the in-helmet battery 1530. If, however, the in-helmet energy regulator 1520 determines that the battery level of the in-helmet battery 1530 is above the threshold level, the in-helmet energy regulator 1520 may use the external power source 1550 to maintain the battery level of the in-helmet battery 1530. Additionally or alternatively, depending on the battery level of the in-helmet battery 1530, the in-helmet energy regulator 1520 may supply energy directly from the external power source 1550 to the heated shield 1540, other components of the helmet 1510, and/or other components that are coupled to the helmet 1510. In some embodiments, the in-helmet energy regulator 1520 may supply energy directly from the external power source 1550 in response to detecting that the external power source 1530 is connected to the helmet 1510 regardless of the battery level of the in-helmet battery 1530.

The above specification, examples and data provide a complete description of the manufacture and use of the composition of the invention. Since many embodiments of the invention can be made without departing from the spirit and scope of the invention, the invention resides in the claims hereinafter appended.

What is claimed is:

1. A wearable device for establishing a communication channel between the wearable device and a recreational vehicle that is in close proximity to the wearable device, the wearable device comprising:
   a communication device;
   a processor operatively coupled to the communication device; and
   memory comprising instructions that when executed by the processor cause the processor to:
   detect a recreational vehicle that is in a range of the communication device;
   determine, in response to a detection by the wearable device, if the wearable device has been previously paired with the recreational vehicle; and
   establish, in response to a determination that the wearable device has been previously paired with the recreational vehicle, a communication channel with the recreational vehicle.

2. The wearable device of claim 1, wherein to detect the recreational vehicle that is in the range of the communication device comprises to detect a recreational vehicle using at least one of radiofrequency fields, magnetic fields, and sound waves.

3. The wearable device of claim 1, wherein to detect the recreational vehicle that is in the range of the communication device comprises to:
   detect radio signals generated by a recreational vehicle;
   determine a strength of the radio signals;
   determine whether the strength of the radio signals is above a predefined threshold; and
   determine, in response to a determination that the strength of the radio signals is above the predefined threshold, that the recreational vehicle is in the range of the communication device.

4. The wearable device of claim 1, wherein to detect the recreational vehicle that is in the range of the communication device comprises to:
   detect low frequency magnetic fields generated by a recreational vehicle;
   determine a strength of the low frequency magnetic fields;
   determine a distance from the recreational vehicle based on the strength of the low frequency magnetic fields; and
   determine whether the recreational vehicle is in the range of the communication device.

5. The wearable device of claim 1, wherein to detect the recreational vehicle that is in the range of the communication device comprises to:
   detect sound waves generated by a recreational vehicle;
   measure an elapsed time of the sound waves using the speed of sound;
   determine a distance from the recreational vehicle based on the elapsed time; and
   determine whether the recreational vehicle is in the range of the communication device.

6. The wearable device of claim 5, wherein the elapsed time is a time duration between a start time that the sound waves were transmitted from the recreational vehicle and an end time the sound waves were received by the wearable device.

7. The wearable device of claim 1, wherein the memory further comprising instructions that when executed by the processor cause the processor to perform, in response to a determination that the wearable device has not been previously paired with the recreational vehicle and by the wearable device, an initial pairing process to set up a communication channel between the wearable device.

8. The wearable device of claim 7, wherein to perform the initial pairing process comprises to:
prompt a user of the wearable device whether to pair with the recreational vehicle;
receive an authorization from the user; and
communicate with the recreational vehicle to establish the communication channel.

9. The wearable device of claim 7, wherein to perform the initial pairing process comprises to:
prompt a user of the recreational vehicle whether to pair with the wearable device;
receive an authorization from the user; and
communicate with the wearable device to establish the communication channel.

10. The wearable device of claim 1, wherein the communication channel is an audio communication channel.

11. The wearable device of claim 1, wherein the communication device is supported by a helmet.

12. The wearable device of claim 1, wherein to establish a communication channel with the recreational vehicle further comprises to establish a communication channel with a second wearable device that is in range of the recreational vehicle and has an established communication channel with the recreational vehicle.

13. The wearable device of claim 1, wherein the recreational vehicle is in the range of the communication device when the wearable device is spaced apart from the recreational vehicle.

14. The wearable device of claim 1, wherein the recreational vehicle is in the range of the communication device when the wearable device is within a meter of the recreational vehicle.

15. A method for establishing a communication channel between the wearable device and a recreational vehicle that is in close proximity to the wearable device, the method comprising:
detecting, by the wearable device, a recreational vehicle that is in a range of a communication device of the wearable device;
determining, in response to detecting that the recreational vehicle is in a range of a communication device of the wearable device and by the wearable device, if the wearable device has been previously paired with the recreational vehicle; and
establishing, in response to determining that the wearable device has been previously paired with the recreational vehicle and by the wearable device, a communication channel with the recreational vehicle.

16. The method of claim 15, wherein detecting the recreational vehicle that is in a range of a communication device of the wearable device comprises detecting, by the wearable device, a recreational vehicle using at least one of radiofrequency fields, magnetic fields, and sound waves.

17. The method of claim 15, wherein detecting the recreational vehicle recreational vehicle that is in a range of a communication device of the wearable device comprises:
detecting, by the wearable device, radio signals generated by a recreational vehicle;
determining, by the wearable device, a strength of the radio signals;
determining, by the wearable device, whether the strength of the radio signals is above a predefined threshold; and
determining, in response to determining that the strength of the radio signals is above the predefined threshold and by the wearable device, that the recreational vehicle is the range of the communication device.

18. The method of claim 15, wherein detecting the recreational vehicle recreational vehicle that is in a range of a communication device of the wearable device comprises:
detecting, by the wearable device, low frequency magnetic fields generated by a recreational vehicle;
determining, by the wearable device, a strength of the low frequency magnetic fields;
determining, by the wearable device, a distance from the recreational vehicle based on the strength of the low frequency magnetic fields; and
determining, by the wearable device, whether the recreational vehicle is the range of the communication device.

19. The method of claim 15, wherein detecting the recreational vehicle recreational vehicle that is in a range of a communication device of the wearable device comprises:
detecting, by the wearable device, sound waves generated by a recreational vehicle;
measuring, by the wearable device, an elapsed time of the sound waves using the speed of sound;
determining, by the wearable device, a distance from the recreational vehicle based on the elapsed time; and
determining, by the wearable device, whether the recreational vehicle is the range of the communication device.

20. The method of claim 19, wherein the elapsed time is a time duration between a start time that the sound waves were transmitted from the recreational vehicle and an end time the sound waves were received by the wearable device.

21. The method of claim 15, further comprising performing, in response to determining that the wearable device has not been previously paired with the recreational vehicle and by the wearable device, an initial pairing process to set up a communication channel between the wearable device.

22. The method of claim 21, wherein performing the initial pairing process comprises:
prompting, by the wearable device, a user of the wearable device whether to pair with the recreational vehicle;
receiving, by the wearable device, an authorization from the user; and
communicating, by the wearable device, with the recreational vehicle to establish the communication channel.

23. The method of claim 21, wherein performing the initial pairing process comprises:
prompting, by the recreational vehicle, a user of the recreational vehicle whether to pair with the wearable device;
receiving, by the recreational vehicle, an authorization from the user; and
communicating, by the recreational vehicle, with the wearable device to establish the communication channel.

24. The method of claim 15, wherein the communication channel is an audio communication channel.

* * * * *